United States Patent
Jain et al.

(10) Patent No.: US 12,342,895 B2
(45) Date of Patent: Jul. 1, 2025

(54) HAPTIC ENABLED SMART HELMET FOR ENHANCED SAFETY

(71) Applicants: Armaan Jain, Potomac, MD (US);
Akshay Jilla, Clarksburg, MD (US);
Zaheen Ahmed, Clarksburg, MD (US);
Shrey Agarwal, Clarksburg, MD (US)

(72) Inventors: Armaan Jain, Potomac, MD (US);
Akshay Jilla, Clarksburg, MD (US);
Zaheen Ahmed, Clarksburg, MD (US);
Shrey Agarwal, Clarksburg, MD (US)

( * ) Notice: Subject to any disclaimer, the term of this patent is extended or adjusted under 35 U.S.C. 154(b) by 0 days.

(21) Appl. No.: 19/015,763

(22) Filed: Jan. 10, 2025

(65) Prior Publication Data

US 2025/0143399 A1 May 8, 2025

Related U.S. Application Data

(63) Continuation-in-part of application No. 18/672,384, filed on May 23, 2024.

(60) Provisional application No. 63/509,848, filed on Jun. 23, 2023.

(51) Int. Cl.
*A42B 3/04* (2006.01)
*G01S 15/88* (2006.01)
*G06F 3/01* (2006.01)
*G08B 6/00* (2006.01)
*G08B 21/04* (2006.01)
*G08B 25/10* (2006.01)

(52) U.S. Cl.
CPC ............. *A42B 3/046* (2013.01); *G01S 15/88* (2013.01); *G06F 3/016* (2013.01); *G08B 6/00* (2013.01); *G08B 21/0469* (2013.01); *G08B 25/10* (2013.01)

(58) Field of Classification Search
CPC ...... A42B 3/046; G08B 6/00; G08B 21/0469; G01S 15/02; G01S 15/86; G01S 15/88; G06F 3/016

See application file for complete search history.

(56) References Cited

U.S. PATENT DOCUMENTS

| | | |
|---|---|---|
| 7,337,650 B1 | 3/2008 | Preston et al. |
| 9,389,677 B2 | 7/2016 | Hobby et al. |
| 10,210,723 B2 | 2/2019 | Mappus et al. |
| 10,373,452 B2 * | 8/2019 | Maalouf ............... G06F 3/017 |

(Continued)

*Primary Examiner* — John A Tweel, Jr.
(74) *Attorney, Agent, or Firm* — Raj S. Davé; Davé Law Group, LLC

(57) ABSTRACT

Embodiments relate to an apparatus comprising a sensing module comprising an ultrasonic sensor; a haptic module comprising a vibratory actuator; a positioning module comprising a gyroscope; an actuator motor, and a processor. The processor is configured to detect a position and an orientation of a body part of a user using the positioning module, dynamically align the ultrasonic sensing module parallel to the ground using the attached actuators based on the position and the orientation of the body part of the user, sense and obtain data from surroundings using the ultrasonic sensing module, detect a presence, a distance and a location of an obstacle with respect to the user by processing the data, and alert the user by providing haptic feedback using the haptic module comprising the vibratory actuator, based on the location of the obstacle. In an embodiment the apparatus is integrated into a smart helmet.

20 Claims, 14 Drawing Sheets

(56) References Cited

U.S. PATENT DOCUMENTS

| | | |
|---|---|---|
| 10,529,216 B1 | 1/2020 | Thibault et al. |
| 11,169,264 B2 | 11/2021 | Crew et al. |
| 11,386,758 B2 * | 7/2022 | Mappus ................ G01S 15/88 |
| 2014/0173812 A1 | 6/2014 | Krueger |
| 2019/0261724 A1 | 8/2019 | Chen et al. |
| 2019/0357618 A1 | 11/2019 | Zheng et al. |
| 2024/0381966 A1 * | 11/2024 | Jain ....................... G01S 15/88 |

* cited by examiner

HAPTIC ENABLED SMART HELMET FOR ENHANCED SAFETY

CROSS-REFERENCE TO RELATED APPLICATIONS

This Application is a Continuation-In-Part of U.S. patent application Ser. No. 18/672,384, filed on May 23, 2024, which claims the benefit under 35 U.S.C. § 119 of U.S. Provisional Application No. 63/509,848, filed on Jun. 23, 2023; which are hereby incorporated by reference in their entirety.

FIELD OF INVENTION

The present disclosure relates to the field of safety equipment. The disclosure is more specifically related to a haptic enabled smart helmet designed to enhance the safety of the user wearing the smart helmet.

BACKGROUND

Cycling is a popular recreational activity, but individuals with hearing disabilities often face limitations and safety concerns due to their reduced ability to perceive auditory cues. Conventional helmets do not address the specific needs of deaf or hard-of-hearing cyclists, leaving them vulnerable to potential accidents and injuries. Therefore, there is a need for an innovative solution that enables these individuals to enjoy cycling safely by providing alternative sensory feedback.

SUMMARY

The following presents a summary to provide a basic understanding of one or more embodiments described herein. This summary is not intended to identify key or critical elements or delineate any scope of the different embodiments and/or any scope of the claims. The sole purpose of the summary is to present some concepts in a simplified form as a prelude to the more detailed description presented herein.

One or more embodiments described herein, present apparatus, systems, methods, computer-implemented methods, computer program products, and/or non-transitory computer-readable mediums that enable a helmet which has embedded intelligent electronics to enhance safety of cyclists.

According to one or more embodiments the apparatus comprises an ultrasonic sensing module which comprises an ultrasonic sensor connected to and driven by an actuator motor, a haptic module comprising a vibratory actuator, a positioning module which comprises a 3-axis gyroscope, and a processor. The processor is configured to receive signals from the 3-axis gyroscope that helps in determining the angle of the user's head relative to the ground, and the processor then sends a signal to the actuator motor connected to the ultrasonic sensor to compensate for the head tilt thereby dynamically aligning the ultrasonic sensor parallel to the ground in real time. The ultrasonic sensors, upon dynamic alignment sense and obtain data from the surroundings, detect a presence, distance and location of an obstacle with respect to the user by processing the data, and alert the user by providing haptic feedback using the haptic module, based on the location of the obstacle.

In one embodiment, the apparatus is integrated into a helmet. Preferably, the ultrasonic sensing module is dynamically aligned in a direction behind the user when the helmet is worn by the user with the use of the positioning module which includes a 3-axis gyroscope which feeds the positional information to the processor, which in turn adjusts the ultrasonic sensors using the attached actuators to be parallel to the ground while making any measurements. In another embodiment, the apparatus is integrated into a wearable object that is worn by the user. Preferably, the ultrasonic sensing module is dynamically aligned in a direction behind the user when the user wears the wearable object. In an embodiment, the positioning module includes a 3-axis gyroscope that detects the position and angle of the head, and that information is used to drive the actuators to make the attached ultrasonic sensors parallel to the ground. In an embodiment, the ultrasonic sensing module comprises an ultrasonic emitter and an ultrasonic detector, wherein the ultrasonic emitter is operable to emit an ultrasonic signal, and the ultrasonic detector is operable to receive a signal reflected from the obstacle.

According to an embodiment, the haptic feedback is provided to the user by the haptic module which includes a vibratory actuator, when strength of the signal is above a set threshold limit, wherein the haptic feedback is selectively provided on a right side of the apparatus when the location of the obstacle is determined to be on a right side of the user, and on a left side of the apparatus when the location of the obstacle is determined to be on a left side of the user.

In an embodiment, the apparatus further comprises a communication module that establishes a connection and communicates with a mobile device. In one embodiment, the communication module is a Global System for Mobile Communications (GSM) module for communicating with one or more GSM enabled devices. In another embodiment, the communication module is a Bluetooth module, for communicating with one or more Bluetooth enabled devices. The communication module automatically transmits real time data and just-in-time data. In an embodiment, the mobile device is at least one of a smart phone, a wristwatch, and a portable computing device.

In an embodiment the apparatus further comprises a global positioning satellite (GPS) system operable to determine a current location of the user. The communication module is further operable to provide a graphical representation of the data by mapping the presence, the distance and the location of the obstacle, and the current location of the user. In another embodiment the apparatus comprises one or more cameras, wherein the cameras are operable to scan and record a first data from the surroundings, wherein the communication module transmits the first data to the mobile device.

In an additional embodiment, the user is riding a vehicle, wherein the vehicle comprises a two-wheeler vehicle. In an embodiment, the apparatus further comprises a three-axis accelerometer operable to detect changes in motion of the user. In another embodiment, the apparatus further comprises impact sensors operable to detect an impact, wherein the impact is caused by one or more of a collision of the obstacle with the vehicle the user is riding, a collision of the vehicle with the obstacle, and a fall of the user, wherein upon detecting the impact, the communication module transmits a communication comprising the current location of the user to an emergency service. In an additional embodiment, the apparatus further comprises a trigger safety mechanism operable to detect a potential collision between the obstacle and the vehicle the user is riding, wherein the trigger safety mechanism, upon detecting the potential collision, provides a first haptic feedback via the haptic module comprising a vibratory actuator, wherein the first haptic feedback alerts the user to activate an anti-skid mechanism.

In another embodiment, the apparatus further comprises a sound sensor that identifies a second data from the surroundings, wherein the apparatus upon identifying the second data, provides a second haptic feedback to the user, wherein the second haptic feedback alerts the user for an appropriate action, wherein the appropriate action comprises making way for the obstacle causing the second data.

In an embodiment, the apparatus is powered by a battery, wherein the battery is rechargeable, and wherein the apparatus further comprises a charging port operable to charge the battery. In an embodiment, the apparatus further comprises a temperature sensor operable to detect overheating of the apparatus and initiate a reset function of the apparatus. In an embodiment, the user is a hearing-impaired user.

According to one or more embodiments the system comprises an ultrasonic sensing module which comprises of an ultrasonic sensor connected to and driven by an actuator motor, a haptic module comprising a vibratory actuator, a positioning module which includes a 3-axis gyroscope, and a processor. The processor is configured to receive signals from the 3-axis gyroscope that helps in determining the angle of the user's head relative to the ground, and the processor then sends a signal to an actuator connected to the ultrasonic sensor thereby dynamically aligning the ultrasonic sensor parallel to the ground in real time. The ultrasonic sensors sense and obtain data from the surroundings, detect a presence, distance and location of an obstacle with respect to the user by processing the data, and alert the user by providing haptic feedback using the haptic module, based on the location of the obstacle.

In an embodiment the system is integrated into a smart helmet, wherein the ultrasonic sensing module is dynamically aligned using the positioning module which includes a 3-axis gyroscope in a direction behind the user when the user wears the smart helmet. In another embodiment, the system is integrated into a wearable object to be worn by the user, wherein the ultrasonic sensing module is dynamically aligned using the positioning module which includes a 3-axis gyroscope in a direction behind the user when the wearable object is worn by the user.

In an embodiment of the system the positioning module comprises a 3-axis gyroscope that allows for precise measurement of the ultrasonic sensors' angles relative to the ground. In an embodiment the ultrasonic sensing module comprises an ultrasonic emitter and an ultrasonic detector and is attached to an actuator that positions it parallel to the ground based on the information received by the 3-axis gyroscope. In an embodiment the ultrasonic emitter is operable to emit an ultrasonic signal, and the ultrasonic detector is operable to receive a signal reflected from the obstacle. In an embodiment the haptic feedback is provided to the user when strength of the signal is above a set threshold limit. In an embodiment the haptic feedback is selectively provided on a right side of the user when the location of the obstacle is determined to be on the right side of the user, and on a left side of the user when the location of the obstacle is determined to be on the left side of the user.

In an embodiment the system further comprises a communication module operable to establish a connection with a mobile device and automatically transmit in real time data. In an embodiment the communication module is further operable to provide a graphical representation of the data by mapping the presence, the distance and the location of the obstacle, and a current location of the user.

In an embodiment, the system further comprises a communication module that establishes a connection and communicates with a mobile device. In an embodiment, the communication module is a GSM module for communicating with one or more GSM enabled devices. In another embodiment, the communication module is a Bluetooth module, for communicating with one or more Bluetooth enabled devices. The communication module automatically transmits real time data and just-in-time data. In an embodiment, the mobile device is at least one of a smart phone, a wristwatch, and a portable computing device, wherein the mobile device comprises an application interface, wherein the data received from the communication module is stored in a database, and wherein the application interface is operable to retrieve the data from the database and present the data for future reference.

In an embodiment, the system further comprises one or more cameras, wherein the cameras are operable to scan and record a first data from the surroundings. In an embodiment, the communication module is operable to transmit the first data to the mobile device.

In an embodiment, the system further comprises impact sensors operable to detect an impact, wherein the impact is caused by one or more of a collision of the obstacle with a vehicle the user is riding, a collision of the vehicle with the obstacle, and a fall of the user. In an embodiment, upon detecting the impact, the communication module is operable to transmit a communication comprising a current location of the user to an emergency service.

In an embodiment, the system further comprises a trigger safety mechanism operable to detect a potential collision between the obstacle and a vehicle the user is riding. In an embodiment, the trigger safety mechanism upon detecting the potential collision, is operable to provide a first haptic feedback via the haptic module comprising the vibratory actuator. In an embodiment, the first haptic feedback is operable to alert the user to activate an anti-skid mechanism.

An embodiment relates to a method, comprising: detecting a position and an orientation of a body part of a user using a positioning module; aligning dynamically an ultrasonic sensing module based on the position and the orientation of the body part of the user; sensing and obtaining data from surroundings using the ultrasonic sensing module; detecting a presence, a distance and a location of an obstacle with respect to the user by processing the data; and alerting the user by providing haptic feedback using a haptic module comprising a vibratory actuator, based on the location of the obstacle.

In an embodiment, the method is operable to be integrated into a smart helmet, wherein the ultrasonic sensing module is attached to an actuator that dynamically aligns the sensor to stay parallel to the ground in a direction behind the user when the smart helmet is worn by the user, using the information collected by the 3-axis gyroscope in the positioning module and managed by the processor. In another embodiment, the method is operable to be integrated into a wearable object to be worn by the user, wherein the ultrasonic sensing module is dynamically aligned with the aforementioned 3-axis gyroscope and the attached actuator in a direction behind the user when the wearable object is worn by the user.

Additional embodiments relate to one or more methods comprising: transmitting automatically, via a communication module, in real time the data to a mobile device, determining, via a global positioning satellite (GPS) system, a current location of the user, and providing, via the communication module, a graphical representation of the data by mapping the presence, the distance and the location of the obstacle, and the current location of the user, to the mobile device. Another embodiment relates to recording, via one or more cameras, a first data from the surroundings, and transmitting, via the communication module, the first data to the mobile device.

According to one or more embodiments, the non-transitory computer-readable medium stores a sequence of instructions, which when executed by a computer system perform operations comprising: detecting, a position and an orientation of a body part of a user via a positioning module; aligning dynamically an ultrasonic sensing module based on the position and the orientation of the body part of the user; sensing and obtaining data from surroundings via the ultrasonic sensing module; detecting a presence, a distance and a location of an obstacle with respect to the user by processing the data; and alerting the user by providing haptic feedback via a haptic module comprising a vibratory actuator, based on the location of the obstacle.

In an embodiment, the medium and the computer system are integrated into a smart helmet. In another embodiment, the medium and the computer system are integrated into a wearable object to be worn by the user.

In an embodiment of the system, the machine learning model is configured to learn using labelled data using a supervised learning method, wherein the supervised learning method comprises logic using at least one of a decision tree, a logistic regression, a support vector machine, a k-nearest neighbors, a Naïve Bayes, a random forest, a linear regression, a polynomial regression, and a support vector machine for regression.

In an embodiment of the system, the machine learning model is configured to learn from the real time data using an unsupervised learning method, wherein the unsupervised learning method comprises logic using at least one of a k-means clustering, a hierarchical clustering, a hidden Markov model, and an apriori algorithm.

In an embodiment of the system, the machine learning model has a feedback loop, wherein the output from a previous step is fed back to the model in real time to improve the performance and accuracy of the output of a next step.

In an embodiment of the system, the machine learning model comprises a recurrent neural network model.

In an embodiment of the system, the machine learning model has a feedback loop, wherein the learning is further reinforced with a reward for each true positive of the output of the system.

In an embodiment, the system further comprises a cyber security module wherein the cyber security module comprises an information security management module providing isolation between the communication module and servers.

In an embodiment, the information security management module is operable to, receive data from the communication module, exchange a security key at a start of the communication between the communication module and the server, receive the security key from the server, authenticate an identity of the server by verifying the security key, analyze the security key for a potential cyber security threat, negotiate an encryption key between the communication module and the server, encrypt the data; and transmit the encrypted data to the server when no cyber security threat is detected.

In an embodiment, the information security management module is operable to exchange a security key at a start of the communication between the communication module and the server, receive the security key from the server, authenticate an identity of the server by verifying the security key, analyze the security key for a potential cyber security threat, negotiate an encryption key between the system and the server, receive encrypted data from the server, decrypt the encrypted data, perform an integrity check of the decrypted data and transmit the decrypted data to the communication module when no cyber security threat is detected.

DETAILED DESCRIPTION

Definitions and General Techniques

Figure 1:
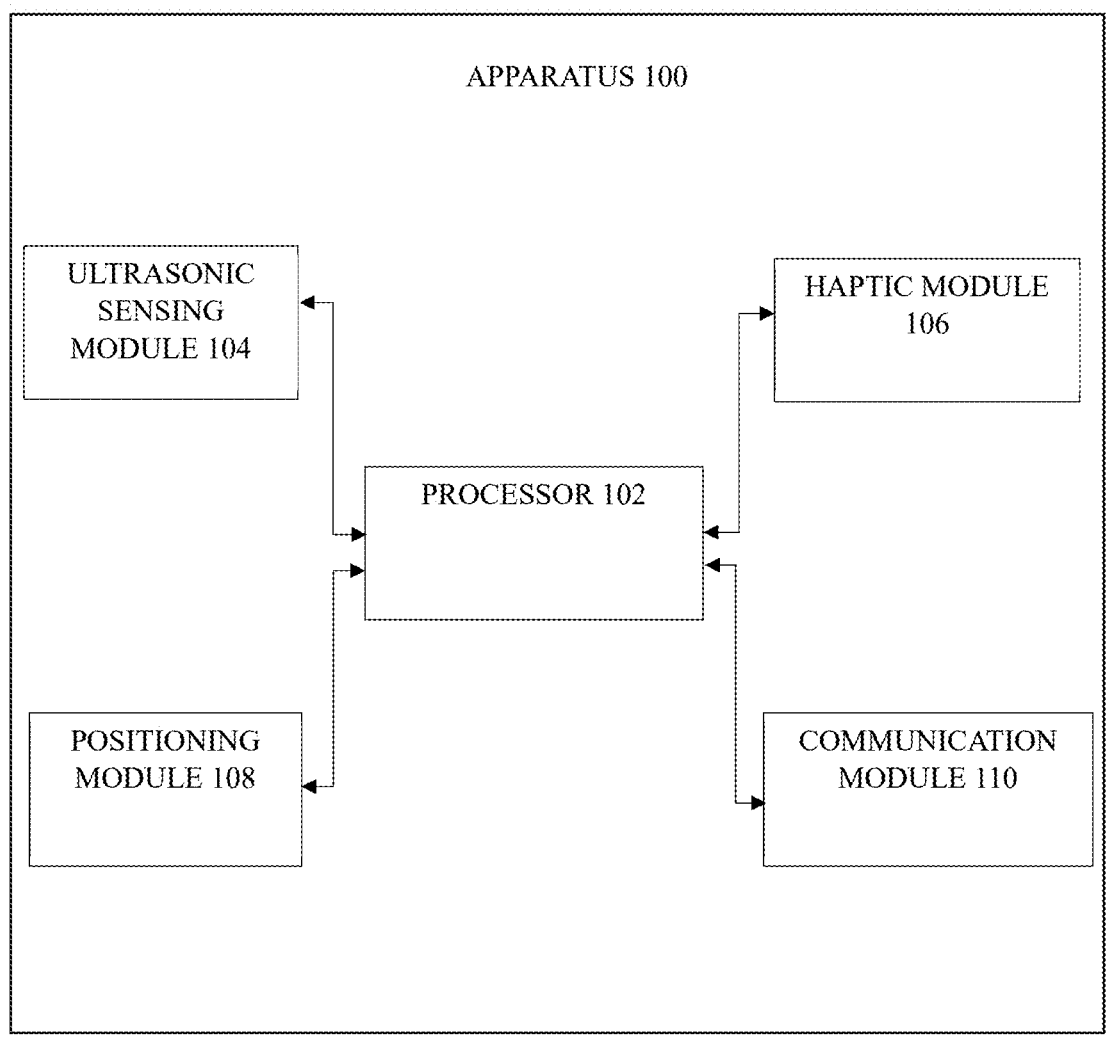
FIG. 1 is a block diagram of various components of the wearable apparatus according to an embodiment.

For simplicity and clarity of illustration, the figures illustrate the general manner of construction. The description and figures may omit the descriptions and details of well-known features and techniques to avoid unnecessarily obscuring the present disclosure. The figures exaggerate the dimensions of some of the elements relative to other elements to help improve understanding of embodiments of the present disclosure. The same reference numeral in different figures denotes the same element.

Although the detailed description herein contains many specifics for the purpose of illustration, a person of ordinary skill in the art will appreciate that many variations and alterations to the details are considered to be included herein.

Accordingly, the embodiments herein are without any loss of generality to, and without imposing limitations upon, any claims set forth. The terminology used herein is for the purpose of describing particular embodiments only and is not limiting. Unless defined otherwise, all technical and scientific terms used herein have the same meaning as commonly understood by one with ordinary skill in the art to which this disclosure belongs. The following terms and phrases, unless otherwise indicated, shall be understood to have the following meanings.

As used herein, the articles "a" and "an" used herein refer to one or to more than one (i.e., to at least one) of the grammatical object of the article. By way of example, "an element" means one element or more than one element. Moreover, usage of articles "a" and "an" in the subject specification and annexed drawings construe to mean "one or more" unless specified otherwise or clear from context to mean a singular form.

As used herein, the terms "example" and/or "exemplary" mean serving as an example, instance, or illustration. For the avoidance of doubt, such examples do not limit the described subject matter herein. In addition, any aspect or design described herein as an "example" and/or "exemplary" is not necessarily preferred or advantageous over other aspects or designs, nor does it preclude equivalent exemplary structures and techniques known to those of ordinary skill in the art.

As used herein, the terms "first," "second," "third," and the like in the description and in the claims, if any, distinguish between similar elements and do not necessarily describe a particular sequence or chronological order. The terms are interchangeable under appropriate circumstances such that the embodiments herein are, for example, capable of operation in sequences other than those illustrated or otherwise described herein. Furthermore, the terms "include," "have," and any variations thereof, cover a non-exclusive inclusion such that a process, method, system, article, device, or apparatus that comprises a list of elements is not necessarily limiting to those elements, but may include other elements not expressly listed or inherent to such process, method, system, article, device, or apparatus.

As used herein, the terms "left," "right," "front," "back," "top," "bottom," "over," "under" and the like in the description and in the claims, if any, are for descriptive purposes and not necessarily for describing permanent relative positions. The terms so used are interchangeable under appropriate circumstances such that the embodiments of the apparatus, methods, and/or articles of manufacture described herein are, for example, capable of operation in other orientations than those illustrated or otherwise described herein.

No element act, or instruction used herein is critical or essential unless explicitly described as such. Furthermore, the term "set" includes items (e.g., related items, unrelated items, a combination of related items and unrelated items, etc.) and may be interchangeable with "one or more." Where only one item is intended, the term "one" or similar language is used. Also, the terms "has," "have," "having," or the like are open-ended terms. Further, the phrase "based on" means "based, at least in part, on" unless explicitly stated otherwise.

As used herein, the terms "system," "device," "unit," and/or "module" refer to a different component, component portion, or component of the various levels of the order. However, other expressions that achieve the same purpose may replace the terms.

As used herein, the terms "couple," "coupled," "couples," "coupling," and the like refer to connecting two or more elements mechanically, electrically, and/or otherwise. Two or more electrical elements may be electrically coupled together, but not mechanically or otherwise coupled together. Coupling may be for any length of time, e.g., permanent, or semi-permanent or only for an instant. "Electrical coupling" includes electrical coupling of all types. The absence of the word "removably," "removable," and the like, near the word "coupled" and the like does not mean that the coupling, etc. in question is or is not removable.

As used herein, the term "or" means an inclusive "or" rather than an exclusive "or." That is, unless specified otherwise, or clear from context, "X employs A or B" means any of the natural inclusive permutations. That is, if X employs A; X employs B; or X employs both A and B, then "X employs A or B" is satisfied under any of the foregoing instances.

As used herein, two or more elements or modules are "integral" or "integrated" if they operate functionally together. Two or more elements are "non-integral" if each element can operate functionally independently.

As used herein, the term "real time" refers to operations conducted as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As used herein, the term "approximately" can mean within a specified or unspecified range of the specified or unspecified stated value. In some embodiments, "approximately" can mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As used herein the term "component" refers to a distinct and identifiable part, element, or unit within a larger system, structure, or entity. It is a building block that serves a specific function or purpose within a more complex whole. Components are often designed to be modular and interchangeable, allowing them to be combined or replaced in various configurations to create or modify systems. Components may be a combination of mechanical, electrical, hardware, firmware, software, and/or other engineering elements.

Digital electronic circuitry, or computer software, firmware, or hardware, including the structures disclosed in this specification and their structural equivalents, or in combinations of one or more of them may realize the implementations and all of the functional operations described in this specification. Implementations may be as one or more computer program products i.e., one or more modules of computer program instructions encoded on a computer-readable medium for execution by, or to control the operation of, data processing apparatus. The computer-readable medium may be a machine-readable storage device, a machine-readable storage substrate, a memory device, a composition of matter affecting a machine-readable propagated signal, or a combination of one or more of them. The term "computing system" encompasses all apparatus, devices, and machines for processing data, including by way of example, a programmable processor, a computer, or multiple processors or computers. The apparatus may include, in addition to hardware, code that creates an execution environment for the computer program in question, e.g., code that constitutes processor firmware, i.e. processor storing instructions, a protocol stack, a database management system, an operating system, or a combination of one or more of them. A propagated signal is an artificially generated signal (e.g., a machine-generated electrical, optical, or electromagnetic signal) that encodes information for transmission to a suitable receiver apparatus.

The actual specialized control hardware or software code used to implement these systems and/or methods is not limiting to the implementations. Thus, any software and any hardware can implement the systems and/or methods based on the description herein without reference to specific software code.

A computer program (also known as a program, software, software application, script, or code) is written in any appropriate form of programming language, including compiled or interpreted languages. Any appropriate form, including a standalone program or a module, component, subroutine, or other unit suitable for use in a computing environment may deploy it. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may execute on one computer or on multiple computers that are located at one site or distributed across multiple sites and interconnected by a communication network.

One or more programmable processors, storing instructions, executing one or more computer programs to perform functions by operating on input data and generating output, perform the processes and logic flows described in this specification. The processes and logic flows may also be performed by, and apparatus may also be implemented as, special-purpose logic circuitry, for example, without limitation, a Field Programmable Gate Array (FPGA), an Application Specific Integrated Circuit (ASIC), Application Specific Standard Products (ASSPs), System-On-a-Chip (SOC) systems, Complex Programmable Logic Devices (CPLDs), etc.

Processors suitable for the execution of a computer program include, by way of example, both general and special-purpose microprocessors, and any one or more processors of any appropriate kind of digital computer. A processor will receive instructions and data from a read-only memory or a random-access memory or both. Elements of a computer can include a processor for performing instructions and one or more memory devices for storing instructions and data. A computer will also include, or is operatively coupled to receive data, transfer data or both, to/from one or more mass storage devices for storing data e.g., magnetic disks, magneto optical disks, optical disks, or solid-state disks. However, a computer need not have such devices. Moreover, another device, e.g., a mobile telephone, a personal digital assistant (PDA), a mobile audio player, a Global Positioning System (GPS) receiver, etc. may embed a computer. Computer-readable media suitable for storing computer program instructions and data include all forms of non-volatile memory, media and memory devices, including, by way of example, semiconductor memory devices (e.g., Erasable Programmable Read-Only Memory (EPROM), Electronically Erasable Programmable Read-Only Memory (EEPROM), and flash memory devices), magnetic disks (e.g., internal hard disks or removable disks), magneto optical disks (e.g. Compact Disc Read-Only Memory (CD ROM) disks, Digital Versatile Disk-Read-Only Memory (DVD-ROM) disks) and solid-state disks. Special purpose logic circuitry may supplement or incorporate the processor and the memory.

To provide for interaction with a user, a computer may have a display device, e.g., a Cathode Ray Tube (CRT) or Liquid Crystal Display (LCD) monitor, for displaying information to the user, and a keyboard and a pointing device, e.g., a mouse or a trackball, by which the user may provide input to the computer. Other kinds of devices provide for interaction with a user as well. For example, feedback to the user may be any appropriate form of sensory feedback, e.g., visual feedback, auditory feedback, or tactile feedback; and a computer may receive input from the user in any appropriate form, including acoustic, speech, or tactile input.

A computing system that includes a back-end component, e.g., a data server, or that includes a middleware component, e.g., an application server, or that includes a front-end component, e.g., a client computer having a graphical user interface or a Web browser through which a user may interact with an implementation, or any appropriate combination of one or more such back-end, middleware, or front-end components, may realize implementations described herein. Any appropriate form or medium of digital data communication, e.g., a communication network may interconnect the components of the system. Examples of communication networks include a Local Area Network (LAN) and a Wide Area Network (WAN), e.g., Intranet and Internet.

The computing system may include clients and servers. A client and server are remote from each other and typically interact through a communication network. The relationship of the client and server arises by virtue of computer programs running on the respective computers and having a client-server relationship with each other.

Embodiments of the present disclosure may comprise or utilize a special-purpose or general-purpose computer including computer hardware. Embodiments within the scope of the present disclosure may also include physical and other computer-readable media for carrying or storing computer-executable instructions and/or data structures. Such computer-readable media can be any media accessible by a general-purpose or special-purpose computer system. Computer-readable media that store computer-executable instructions are physical storage media. Computer-readable media that carry computer-executable instructions are transmission media. Thus, by way of example and not limitation, embodiments of the disclosure can comprise at least two distinct kinds of computer-readable media: physical computer-readable storage media and transmission computer-readable media.

Although the present embodiments described herein are with reference to specific example embodiments it will be evident that various modifications and changes may be made to these embodiments without departing from the broader spirit and scope of the various embodiments. For example, hardware circuitry (e.g., Complementary Metal Oxide Semiconductor (CMOS) based logic circuitry), firmware, software (e.g., embodied in a non-transitory machine-readable medium), or any combination of hardware, firmware, and software may enable and operate the various devices, units, and modules described herein. For example, transistors, logic gates, and electrical circuits (e.g., Application Specific Integrated Circuit (ASIC) and/or Digital Signal Processor (DSP) circuit) may embody the various electrical structures and methods.

In addition, a non-transitory machine-readable medium and/or a system may embody the various operations, processes, and methods disclosed herein. Accordingly, the specification and drawings are illustrative rather than restrictive.

Physical computer-readable storage media includes RAM, ROM, EEPROM, CD-ROM or other optical disk storage (such as CDs, DVDs, etc.), magnetic disk storage or other magnetic storage devices, solid-state disks or any other medium. They store desired program code in the form of computer-executable instructions or data structures which can be accessed by a general-purpose or special-purpose computer.

As used herein, the term "network" refers to one or more data links that enable the transport of electronic data between computer systems and/or modules and/or other electronic devices. When a network or another communications connection (either hardwired, wireless, or a combination of hardwired or wireless) transfers or provides information to a computer, the computer properly views the connection as a transmission medium. A general-purpose or special-purpose computer access transmission media that can include a network and/or data links which carry desired program code in the form of computer-executable instructions or data structures. The scope of computer-readable media includes combinations of the above, that enable the transport of electronic data between computer systems and/or modules and/or other electronic devices. The term network may include the Internet, a local area network, a wide area network, or combinations thereof. The network may include one or more networks or communication systems, such as the Internet, the telephone system, satellite networks, cable television networks, and various other private and public networks. In addition, the connections may include wired connections (such as wires, cables, fiber optic lines, etc.), wireless connections, or combinations thereof. Furthermore, although not shown, other computers, systems, devices, and networks may also be connected to the network. Network refers to any set of devices or subsystems connected by links joining (directly or indirectly) a set of terminal nodes sharing resources located on or provided by network nodes. The computers use common communication protocols over digital interconnections to communicate with each other. For example, subsystems may comprise the cloud. Cloud refers to servers that are accessed over the Internet, and the software and databases that run on those servers.

Further, upon reaching various computer system components, program code in the form of computer-executable instructions or data structures can be transferred automatically from transmission computer-readable media to physical computer-readable storage media (or vice versa). For example, computer-executable instructions or data structures received over a network or data link can be buffered in RAM within a Network Interface Module (NIC), and then eventually transferred to computer system RAM and/or to less volatile computer-readable physical storage media at a computer system. Thus, computer system components that also (or even primarily) utilize transmission media may include computer-readable physical storage media.

Computer-executable instructions comprise, for example, instructions and data which cause a general-purpose computer, special-purpose computer, or special-purpose processing device to perform a certain function or group of functions. The computer-executable instructions may be, for example, binary, intermediate format instructions such as assembly language, or even source code. Although the subject matter herein described is in a language specific to structural features and/or methodological acts, the described features or acts described do not limit the subject matter defined in the claims. Rather, the herein described features and acts are example forms of implementing the claims.

While this specification contains many specifics, these do not construe as limitations on the scope of the disclosure or of the claims, but as descriptions of features specific to particular implementations. A single implementation may implement certain features described in this specification in the context of separate implementations. Conversely, multiple implementations separately or in any suitable sub-combination may implement various features described herein in the context of a single implementation. Moreover, although features described herein as acting in certain combinations and even initially claimed as such, one or more features from a claimed combination may in some cases be excised from the combination, and the claimed combination may be directed to a sub-combination or variation of a sub-combination.

Similarly, while operations depicted herein in the drawings in a particular order to achieve desired results, this should not be understood as requiring that such operations be performed in the particular order shown or in sequential order or that all illustrated operations be performed, to achieve desirable results. In certain circumstances, multitasking and parallel processing may be advantageous. Moreover, the separation of various system components in the implementations should not be understood as requiring such separation in all implementations, and it should be understood that the described program components and systems may be integrated together in a single software product or packaged into multiple software products.

Even though particular combinations of features are recited in the claims and/or disclosed in the specification, these combinations are not intended to limit the disclosure of possible implementations. Other implementations are within the scope of the claims. For example, the actions recited in the claims may be performed in a different order and still achieve desirable results. In fact, many of these features may be combined in ways not specifically recited in the claims and/or disclosed in the specification. Although each dependent claim may directly depend on only one claim, the disclosure of possible implementations includes each dependent claim in combination with every other claim in the claim set.

Further, a computer system including one or more processors and a computer-readable media such as computer memory may practice the methods. In particular, one or more processors storing instructions execute computer-executable instructions, stored in the computer memory, to perform various functions such as the acts recited in the embodiments.

Those skilled in the art will appreciate that the disclosure may be practiced in network computing environments with many types of computer system configurations including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, etc. Distributed system environments where local and remote computer systems, which are linked (either by hardwired data links, wireless data links, or by a combination of hardwired and wireless data links) through a network, both perform tasks may also practice the disclosure. In a distributed system environment, program modules may be located in both local and remote memory storage devices.

The following terms and phrases, unless otherwise indicated, shall be understood to have the following meanings.

As used herein, the term "Unauthorized access" is when someone gains access to a website, program, server, service, or other system using someone else's account or other methods. For example, if someone kept guessing a password or username for an account that was not theirs until they gained access, it is considered unauthorized access.

As used herein, the term "IoT" stands for Internet of Things which describes the network of physical objects "things" or objects embedded with sensors, software, and other technologies for the purpose of connecting and exchanging data with other devices and systems over the internet.

As used herein "Machine learning" refers to algorithms that give a computer the ability to learn without explicit programming, including algorithms that learn from and make predictions about data. Machine learning techniques include, but are not limited to, support vector machine, artificial neural network (ANN) (also referred to herein as a "neural net"), deep learning neural network, logistic regression, discriminant analysis, random forest, linear regression, rules-based machine learning, Naive Bayes, nearest neighbor, decision tree, decision tree learning, and hidden Markov, etc. For the purposes of clarity, part of a machine learning process can use algorithms such as linear regression or logistic regression. However, using linear regression or another algorithm as part of a machine learning process is distinct from performing a statistical analysis such as regression with a spreadsheet program. The machine learning process can continually learn and adjust the classifier as new data becomes available and does not rely on explicit or rules-based programming. The ANN may be featured with a feedback loop to adjust the system output dynamically as it learns from the new data as it becomes available. In machine learning, backpropagation and feedback loops are used to train the Artificial Intelligence (AI)/Machine Learning (ML) model improving the model's accuracy and performance over time. Statistical modeling relies on finding relationships between variables (e.g., mathematical equations) to predict an outcome.

As used herein, the term "Data mining" is a process used to turn raw data into useful information. It is the process of analyzing large datasets to uncover hidden patterns, relationships, and insights that can be useful for decision-making and prediction.

As used herein, the term "Data acquisition" is the process of sampling signals that measure real world physical conditions and converting the resulting samples into digital numeric values that a computer manipulates. Data acquisition systems typically convert analog waveforms into digital values for processing. The components of data acquisition systems include sensors to convert physical parameters to electrical signals, signal conditioning circuitry to convert sensor signals into a form that can be converted to digital values, and analog-to-digital converters to convert conditioned sensor signals to digital values. Standalone data acquisition systems are often called data loggers.

As used herein, the term "Dashboard" is a type of interface that visualizes particular Key Performance Indicators (KPIs) or Key Result Indicators (KRIs) for a specific goal or process. It is based on data visualization and infographics.

As used herein, a "Database" is a collection of organized information so that it can be easily accessed, managed, and updated. Computer databases typically contain aggregations of data records or files.

As used herein, the term "Data set" (or "Dataset") is a collection of data. In the case of tabular data, a data set corresponds to one or more database tables, where every column of a table represents a particular variable, and each row corresponds to a given record of the data set in question. The data set lists values for each of the variables, such as height and weight of an object, for each member of the data set. Each value is known as a datum. Data sets can also consist of a collection of documents or files.

As used herein, a "sensor" is a device that detects and measures physical properties from the surrounding environment and converts this information into electrical or digital signals for further processing. Sensors play a crucial role in collecting data for various applications across industries. Sensors may be made of electronic, mechanical, chemical, or other engineering components. Examples include sensors to measure temperature, pressure, humidity, proximity, light, acceleration, orientation etc.

The term "communication module" or "communication system" as used herein refers to a system which enables the information exchange between two points. The process of transmission and reception of information is called communication. The elements of communication include but are not limited to a transmitter of information, channel or medium of communication and a receiver of information.

The term "communicate" or "communication" as used herein refers to the transmission of information and/or data from one point to another. Communication may be by means of electromagnetic waves. It is also a flow of information from one point, known as the source, to another, the receiver. Communication comprises one of the following: transmitting data, instructions, and information or a combination of data, instructions, and information. Communication happens between any two communication systems or communicating units. The term "in communication with" may refer to any coupling, connection, or interaction using electrical signals to exchange information or data, using any system, hardware, software, protocol, or format, regardless of whether the exchange occurs wirelessly or over a wired connection.

The term "connection" as used herein refers to a communication link. It refers to a communication channel that connects two or more devices for the purpose of data transmission. It may refer to a physical transmission medium such as a wire, or to a logical connection over a multiplexed medium such as a radio channel in telecommunications and computer networking.

The term "protocol" as used herein refers to a procedure required to initiate and maintain communication; a formal set of conventions governing the format and relative timing of message exchange between two communications terminals; a set of conventions that govern the interactions of processes, devices, and other components within a system; a set of signaling rules used to convey information or commands between boards connected to the bus; a set of signaling rules used to convey information between agents; a set of semantic and syntactic rules that determine the behavior of entities that interact; a set of rules and formats (semantic and syntactic) that determines the communication behavior of simulation applications; a set of conventions or rules that govern the interactions of processes or applications between communications terminals; a formal set of conventions governing the format and relative timing of message exchange between communications terminals; a set of semantic and syntactic rules that determine the behavior of functional units in achieving meaningful communication; a set of semantic and syntactic rules for exchanging information.

The term "communication protocol" as used herein refers to standardized communication between any two systems. An example communication protocol is a Dedicated Short Range Communications (DSRC) protocol. The DSRC protocol uses a specific frequency band (e.g., 5.9 GHz (Gigahertz)) and specific message formats (such as the Basic Safety Message, Signal Phase and Timing, and Roadside Alert) to enable communications between vehicles and infrastructure components, such as traffic signals and roadside sensors. DSRC is a standardized protocol, and its specifications are maintained by various organizations, including the Institute of Electrical and Electronics Engineers (IEEE) and Society of Automotive Engineers (SAE) International.

The term "bidirectional communication" as used herein refers to an exchange of data between two components. In an example, the first component can be a vehicle, and the second component can be an infrastructure that is enabled by a system of hardware, software, and firmware.

The term "in communication with" as used herein, refers to any coupling, connection, or interaction using signals to exchange information, message, instruction, command, and/or data, using any system, hardware, software, protocol, or format regardless of whether the exchange occurs wirelessly or over a wired connection.

The terms "non-transitory computer-readable medium" and "computer-readable medium" include a single medium or multiple media such as a centralized or distributed database, and/or associated caches and servers that store one or more sets of instructions. Further, the terms "non-transitory computer-readable medium" and "computer-readable medium" include any tangible medium that is capable of storing, encoding, or carrying a set of instructions for execution by a processor that, for example, when executed, cause a system to perform any one or more of the methods or operations disclosed herein. As used herein, the term "computer-readable medium" is expressly defined to include any type of computer-readable storage device and/or storage disk and to exclude propagating signals.

The term "application server" refers to a server that hosts applications or software that delivers a business application through a communication protocol. An application server framework is a service layer model. It includes software components available to a software developer through an application programming interface. It is system software that resides between the operating system (OS) on one side, the external resources such as a database management system (DBMS), communications and Internet services on another side, and the users' applications on the third side.

The term "rule-based system" as used herein comprises a set of facts of a scenario and a set of rules for how to deal with the set of facts comprising if and then statements, wherein the scenario is predefined in a system.

As used herein, "Artificial intelligence" or "AI" refers to the ability of a digital computer or computer-controlled robot to perform tasks commonly associated with intelligent beings.

The term "artificial intelligence unit" refers to any system that perceives its environment and takes actions that maximize its chance of achieving its goals. Artificial intelligence unit utilizes a plurality of machine learning algorithms that allow systems to automatically improve through experience and self-learning.

The term "feature" as used herein in relation to machine learning and pattern recognition, represents or refers to an individual measurable property or characteristic of a phenomenon. Features are usually numeric, but structural features such as strings and graphs are used in syntactic pattern recognition. The concept of "feature" is related to that of explanatory variables used in statistical techniques such as linear regression.

The term "cyber security" as used herein refers to application of technologies, processes, and controls to protect systems, networks, programs, devices, and data from cyber-attacks.

The term "cyber security module" as used herein refers to a module comprising application of technologies, processes, and controls to protect systems, networks, programs, devices and data from cyber-attacks and threats. It aims to reduce the risk of cyber-attacks and protect against the unauthorized exploitation of systems, networks, and technologies. It includes, but is not limited to, critical infrastructure security, application security, network security, cloud security, Internet of Things (IoT) security.

The term "encrypt" used herein refers to securing digital data using one or more mathematical techniques, along with a password or "key" used to decrypt the information. It refers to converting information or data into a code, especially to prevent unauthorized access. It may also refer to concealing information or data by converting it into a code. It may also be referred to as cipher, code, encipher, encode. A simple example is representing alphabets with numbers-say, 'A' is '01', 'B' is '02', and so on. For example, a message like "HELLO" will be encrypted as "0805121215," and this value will be transmitted over the network to the recipient(s).

The term "decrypt" used herein refers to the process of converting an encrypted message back to its original format. It is generally a reverse process of encryption. It decodes the encrypted information so that only an authorized user can decrypt the data because decryption requires a secret key or password. This term could be used to describe a method of unencrypting the data manually or unencrypting the data using the proper codes or keys.

The term "cyber security threat" used herein refers to any possible malicious attack that seeks to unlawfully access data, disrupt digital operations, or damage information. A malicious act includes but is not limited to damaging data, stealing data, or disrupting digital life in general. Cyber threats include, but are not limited to, malware, spyware, phishing attacks, ransomware, zero-day exploits, trojans, advanced persistent threats, wiper attacks, data manipulation, data destruction, rogue software, malvertising, unpatched software, computer viruses, man-in-the-middle attacks, data breaches, Denial of Service (DOS) attacks, and other attack vectors.

The term "hash value" used herein can be thought of as fingerprints for files. The contents of a file are processed through a cryptographic algorithm, and a unique numerical value, the hash value, is produced that identifies the contents of the file. If the contents are modified in any way, the value of the hash will also change significantly. Example algorithms used to produce hash values: the Message Digest-5 (MD5) algorithm and Secure Hash Algorithm-1 (SHA1).

The term "integrity check" as used herein refers to the checking for accuracy and consistency of system related files, data, etc. It may be performed using checking tools that can detect whether any critical system files have been changed, thus enabling the system administrator to look for unauthorized alteration of the system. For example, data integrity corresponds to the quality of data in the databases and to the level by which users examine data quality, integrity, and reliability. Data integrity checks verify that the data in the database is accurate, and functions as expected within a given application.

The term "alarm" as used herein refers to a trigger when a component in a system or the system fails or does not perform as expected. The system may enter an alarm state when a certain event occurs. An alarm indication signal is a visual signal to indicate the alarm state. For example, when a cyber security threat is detected, a system administrator may be alerted via sound alarm, a message, a glowing LED, a pop-up window, etc. Alarm indication signal may be reported downstream from a detecting device, to prevent adverse situations or cascading effects.

The term "in communication with" as used herein, refers to any coupling, connection, or interaction using electrical signals to exchange information or data, using any system, hardware, software, protocol, or format, regardless of whether the exchange occurs wirelessly or over a wired connection.

As used herein, the term "cryptographic protocol" is also known as security protocol or encryption protocol. It is an abstract or concrete protocol that performs a security-related function and applies cryptographic methods often as sequences of cryptographic primitives. A protocol describes how the algorithms should be used. A sufficiently detailed protocol includes details about data structures and representations, at which point it can be used to implement multiple, interoperable versions of a program. Cryptographic protocols are widely used for secure application-level data transport. A cryptographic protocol usually incorporates at least some of these aspects: key agreement or establishment, entity authentication, symmetric encryption, and message authentication material construction, secured application-level data transport, non-repudiation methods, secret sharing methods, and secure multi-party computation. Hashing algorithms may be used to verify the integrity of data. Secure Socket Layer (SSL) and Transport Layer Security (TLS), the successor to SSL, are cryptographic protocols that may be used by networking switches to secure data communications over a network.

The embodiments described herein can be directed to one or more of a system, a method, an apparatus, and/or a computer program product at any possible technical detail level of integration. The computer program product can include a computer-readable storage medium (or media) having computer-readable program instructions thereon for causing a processor to carry out aspects of the one or more embodiments described herein.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special-purpose hardware-based systems that can perform the specified functions and/or acts and/or carry out one or more combinations of special-purpose hardware and/or computer instructions.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer-readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

The embodiments described herein include mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The present disclosure may be embodied in other specific forms without departing from its spirit or characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Unless otherwise defined herein, scientific and technical terms used in connection with the present disclosure shall have the meanings that are commonly understood by those of ordinary skill in the art. Further, unless otherwise required by context, singular terms shall include pluralities, and plural terms shall include the singular.

The term "microprocessor" or "processor" as used herein refers to a device that interprets and executes instructions, comprising at least an instruction control unit and an arithmetic unit that contains a central processing unit.

The term "surroundings" or "environment" as used herein refers to surroundings and the space in which a user is stationary, in motion or is riding a vehicle. It refers to dynamic surroundings which includes other vehicles, obstacles, pedestrians, lane boundaries, traffic signs and signals, speed limits, potholes, snow, water, etc.

The term "obstacle" as used herein refers to an obstruction in the surroundings and the space of the user. It may include other vehicles, pedestrians, trees, lane boundaries, traffic signs and signals, speed limits, snow, etc.

As referred herein, "Bluetooth protocol" is a Wireless Personal Area Network (WPAN) technology and is used for exchanging data over smaller distances.

As referred herein, "GSM," Global System for Mobile Communications, is a standard to describe the protocols for second-generation (2G) digital cellular networks used by mobile devices such as mobile phones and tablets.

The term "image resolution" refers to the level of detail of an image. It applies to digital images, film images, and other types of images. "Higher resolution" means more image detail. The term is considered equivalent to pixel count in digital imaging and refers to the number of pixels that exist within that image. The higher the resolution, and the richer the pixel count, means more image detail and definition. For example, 1080p is a set of high-definition video mode characterized by 1,920 pixels displayed across the screen horizontally and 1,080 pixels down the screen vertically and the p stands for progressive scan, i.e., non-interlaced scanning, the method for loading the pixels in each new frame of a video. Other modes include 720p and 360p.

The term "alert" or "alert signal" refers to a communication to attract attention. An alert may include tactile, visual, audible alert, and a combination of these alerts to warn the user. These alerts allow the user the ability to act and respond quickly to avoid or navigate through an emergency.

Technical problem: The problem is that individuals with hearing disabilities often face limitations and safety concerns due to their reduced ability to perceive auditory cues. Conventional helmets do not address the specific needs of deaf or hard-of-hearing cyclists, leaving them vulnerable to potential accidents and injuries. Therefore, there is a need for an apparatus and a system that enables these individuals to enjoy cycling safely by providing alternative sensory feedback.

Technical solution: In an aspect, the apparatus provides a haptic feedback based upon a detection of an object. The apparatus comprises an ultrasonic sensing module, a haptic module comprising a vibratory actuator, a positioning module comprising a gyroscope, for example a 3-axis gyroscope, and a processor. The processor is configured to detect a position and an orientation of a body part of a user using the positioning module, dynamically align the ultrasonic sensing module based on the position and the orientation of the body part of the user (which is detected by the 3-axis gyroscopic sensor, processed by the processor, then used by the motion actuator to adjust the angle of the ultrasonic sensors), sense and obtain data from surroundings using the ultrasonic sensing module, detect a presence, a distance and a location of an obstacle with respect to the user by processing the data, and alert the user by providing haptic feedback using the haptic module comprising the vibratory actuator, based on the location of the obstacle.

In one embodiment, the apparatus may be integrated into a smart helmet. The haptic enabled smart helmet may provide enhanced safety to the user of the smart helmet. Preferably, the ultrasonic sensing module is dynamically aligned with the use of the 3-axis gyroscope which feeds the information about the angle of the user's head to the processor, which in turn uses the actuator motor attached to the ultrasonic sensor to ensure that the ultrasonic sensors are parallel to the ground and in a direction behind the user when the smart helmet is worn by the user. In another embodiment, the apparatus may be integrated into a wearable object that is worn by the user. Preferably, the ultrasonic sensing module is dynamically aligned in a direction behind the user when the user wears the wearable object. The haptic enabled smart helmet may enhance the safety of deaf or hard-of-hearing cyclists, by providing alternative sensory feedback.

FIG. 1 is a block diagram of various components of the apparatus according to an embodiment. The apparatus 100 may comprise a processor 102. In an embodiment, the processor can include a plurality of processors. The apparatus 100 may comprise different modules or subsystems, as shown in FIG. 1, which are communicatively coupled, such as an ultrasonic sensing module 104 comprising and driven by an actuator motor, a haptic module comprising a vibratory actuator 106, a positioning module 108 comprising a gyroscope, wherein the gyroscope may be a 3-axis gyroscope, and a communication module 110. In an embodiment, all the modules may be configured into a single module or may comprise separate modules. The apparatus further comprises a memory and a database.

In an example the apparatus may comprise a wearable object. The wearable object may comprise a suit or a uniform that is wearable by a user and in other examples, a wearable object may take a different form, such as a vest, a shirt, a headband, etc. The materials used for the wearable object can include lightweight, thin, flexible materials or polymers, and other innovative fabric materials that are comfortable and can also adapt to sudden impacts.

Figure 2A:
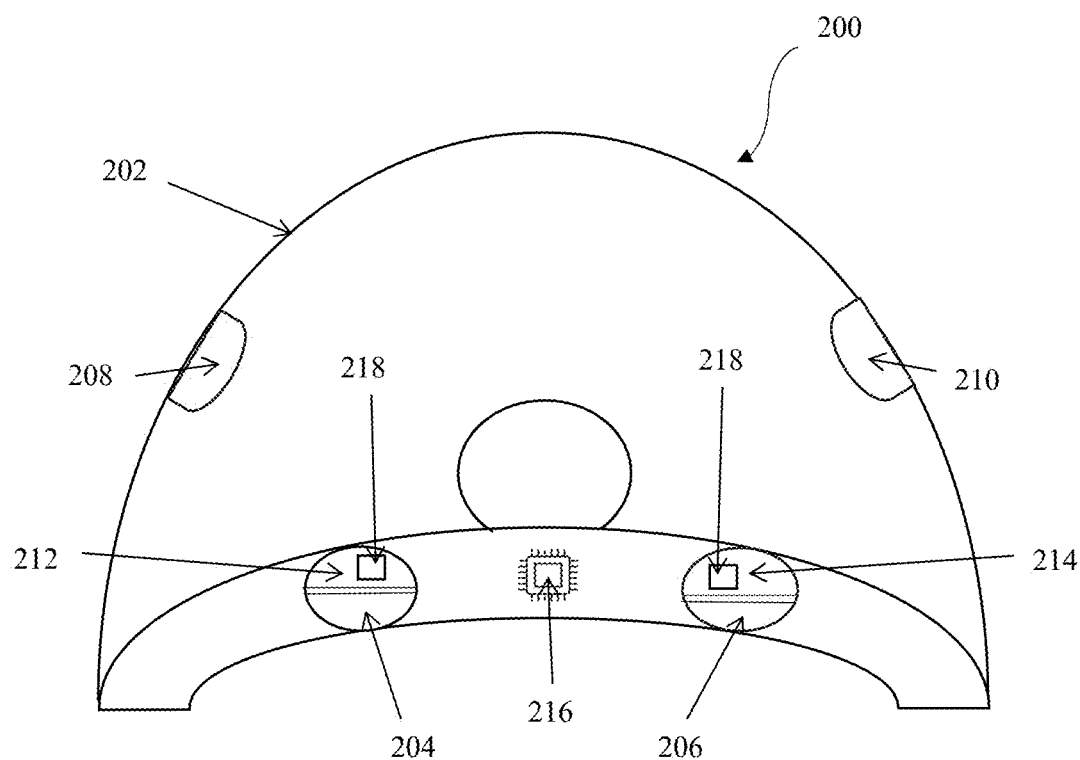
FIG. 2A shows a schematic of a smart helmet in accordance with an exemplary embodiment.

FIG. 2A is a schematic representation of an apparatus 200 according to one exemplary embodiment of the present disclosure. The apparatus 200 in the present embodiment comprises a smart helmet 202. The smart helmet 202 may comprise an ultrasonic sensing module 204, 206 comprising and driven by an actuator motor, a haptic module comprising vibratory actuator 208, 210, a positioning module 212, 214 comprising a 3-axis gyroscope 218 and a processor 216. The processor 216 stores instructions in a non-transitory memory for operating apparatus 200.

In an embodiment, the positioning module may be a 3-axis gyroscope. The ultrasonic sensing module may comprise an ultrasonic emitter and an ultrasonic detector, wherein the ultrasonic emitter is operable to emit an ultrasonic signal, and the ultrasonic detector is operable to receive a signal reflected from the obstacle, and the ultrasonic sensing module is attached to an actuator that adjusts the sensor's position and orientation based on the information from the positioning module to adjust it parallel to the ground.

Figure 2B:
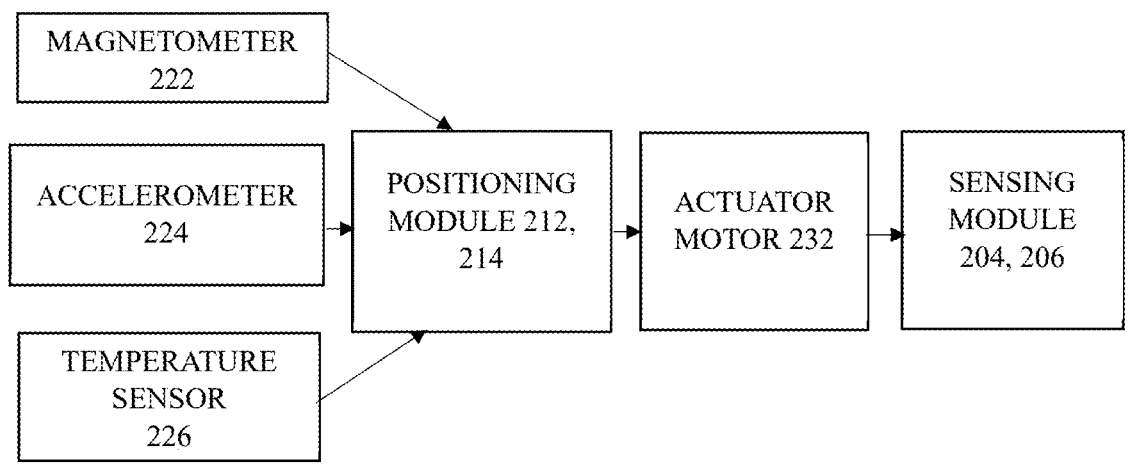
FIG. 2B shows a positioning module and its components and a sensing module connected via actuator motor according to an embodiment.

FIG. 2B shows a positioning module 212, 214 along with its components and a sensing module 204, 206 connected via actuator motor 232 according to an embodiment. The positioning module 212, 214 may further comprise one or more of a magnetometer 222, an accelerometer 224 and a temperature sensor 226. The ultrasonic sensing module 204, 206 and positioning module 212, 214 may have various orientations such that each of the ultrasonic sensing modules 204, 206 may be pointed in a different direction. However, it should be noted that the ultrasonic sensing module 204, 206 is dynamically aligned in a direction behind the user and parallel to the ground with the use of an attached actuator motor 232 which uses the measurements from the 3-axis gyroscope in the positioning module when the user is wearing the smart helmet 202 or the wearable object, as the examples of the present disclosure are directed to blindside risk detection. Accordingly, the ultrasonic sensing module 204, 206 and positioning module 212, 214 are primarily deployed with orientations towards the back of the user, in a way that even when the user tilts their head down while biking, the ultrasonic sensing module 204, 206 get dynamically aligned with the aforementioned use of the 3-axis gyroscope and actuator motor attached to the ultrasonic sensors in a direction behind the user. The ultrasonic sensing module 204, 206 may be strategically positioned on the back left and the back right sides of the smart helmet, facing outward, to detect the surroundings for obstacles. The placement of the ultrasonic sensing module 204, 206 may be at various angles to have the most area coverage possible. The position of the ultrasonic sensing module 204, 206 may be optimized to eliminate blind spots. In one example, the ultrasonic sensing module 204, 206 may have a 30-degree range and their placement is accordingly done to cover the maximum area of the surroundings possible. The ultrasonic sensing module 204, 206 may identify false positives caused by surrounding stationary objects such as trees, buildings, etc.

The ultrasonic sensing module 204, 206 may further comprise ultrasonic emitters and ultrasonic detectors. The positioning module 212, 214 may include gyroscopes or gyro sensors, for example 3-axis gyroscope. The ultrasonic emitter may generate a directional ultrasonic wave, e.g., a wave that is focused on a given direction, with side lobes having lesser intensities as compared to the direction of focus. For example, the ultrasonic emitter may comprise an acoustic array, such as a parametric array which may comprise capacitive ultrasonic transducers, piezoelectric/piezoresistive ultrasonic transducers, or the like. In one example, the ultrasonic detector may comprise the same or similar components as the ultrasonic emitter. For instance, the same or similar components may be used for converting electrical signals into transmitted ultrasonic acoustic signals and for receiving ultrasonic acoustic signals and converting them into electrical signals. The ultrasonic emitter can continuously emit ultrasonic signals, which bounce off obstacles and objects in the surroundings of the user. The reflected signals can be received by the ultrasonic detector. The data from the reflected signals may be processed to obtain a presence, a distance, and a location of an obstacle with respect to the user. The presence of the obstacle may be the determination that there is an obstacle within a certain range of the user. The range may be determined by the signals reflected from the obstacle and received by the ultrasonic detector. The distance of the obstacle may be the distance of the obstacle from the user or how far is the obstacle from the user. The location of the obstacle may be the direction of the obstacle with respect to the user. The location of the obstacle can be right behind the user, on the back left side of the user, on the back right side of the user etc. In addition, in one example, a distance between the user and the object may be calculated based upon a time difference between a time when the ultrasonic signal is transmitted and a time when the reflected ultrasonic signal is received.

Further, in one example, the emitted ultrasonic signals may comprise directional acoustic signals having acoustic energy that is more concentrated in a direction of focus, with attenuated side lobes having a lesser acoustic energy. However, it should be noted that reflected signals may have a more uniform spatial distribution of acoustic energy as compared to the emitted ultrasonic signals, e.g., due to irregular shaped surfaces, movements of the objects, the user and other scattering in the environment. In one example, ultrasonic sensing module 204, 206 each may emit an ultrasonic acoustic signal having a different pattern. For example, the ultrasonic acoustic signals may be differentiated by frequency/wavelength. In one example, the ultrasonic acoustic signals may be separated by 20-30 Hertz (Hz). Alternatively, or in addition, the ultrasonic acoustic signals may be differentiated by a coded pattern. For instance, the ultrasonic acoustic signals may comprise packets of on-off coded ultrasonic acoustic transmissions, a pattern of comprising a combination of long and short ultrasonic acoustic transmissions, and so forth, where each pattern may be different for ultrasonic sensing module 204 and different for ultrasonic sensing module 206. In one example, different frequencies/wavelengths and different coding patterns may both be used in conjunction with one another. The separation in frequency combined with the directionality of the emitters/receivers diminishes the likelihood of false readings. In an example, the ultrasonic detector of each of the ultrasonic sensing modules 204, 206 may be configured to detect a reflected signal having a pattern corresponding to the pattern of the ultrasonic signal that was transmitted from the ultrasonic emitter of the respective one of the ultrasonic sensing module 204, 206.

As mentioned above, the ultrasonic detector may be looking for a reflected ultrasonic signal having a wavelength/frequency corresponding to the ultrasonic signal that was transmitted. However, the transmitted ultrasonic acoustic signal and/or the reflected ultrasonic acoustic signal may have been subjected to Doppler shifts due to a movement of the user and/or the object off of which the ultrasonic signal is reflected. Thus, in one example, a Doppler correction may be applied to a received ultrasonic signal in order to determine whether the received ultrasonic signal is a reflected ultrasonic signal that corresponds to the transmitted ultrasonic signal. Alternatively, or in addition, a range of uncertainty in the received signal may be allowed based upon the speed of the riding vehicle. For instance, any received signal that is within a certain frequency range that includes the frequency/wavelength of the first ultrasonic signal may be considered to be a reflected signal comprising a reflection of the first ultrasonic signal off of the object. In one example, the Doppler correction may be applied by the integrated processor 216 based upon a speed measurement from a speed sensor and/or an accelerometer 224.

According to an embodiment, the haptic feedback may be provided to the user when strength of the signal is above a set threshold limit, wherein the haptic feedback may be selectively provided on a right side of the apparatus when the location of the obstacle is determined to be on a right side of the user, and the haptic feedback may be selectively provided on a left side of the apparatus when the location of the obstacle is determined to be on a left side of the user.

In embodiments, the sensing module in addition to or alternative to ultrasonic sensors, other sensors capable of detecting objects and measuring distance may be used, for example, infrared (IR) sensors, LiDAR (Light Detection and Ranging) sensors, radar sensors, and stereo vision systems. Infrared sensors detect proximity and distance by emitting infrared light and measuring its reflection from nearby objects. LiDAR sensors use laser pulses to measure distances with high precision and create a mapping of 3D model of surroundings. Radar sensors, relying on radio waves, may be used in environments with low visibility, for detecting vehicles or obstacles in foggy or rainy conditions. Stereo vision systems use dual cameras to calculate depth by analyzing disparities in images. These alternatives provide a range of capabilities in terms of accuracy, range, and suitability for specific environmental conditions, for complementing or replacing ultrasonic sensors depending on the requirements.

Figure 3A:
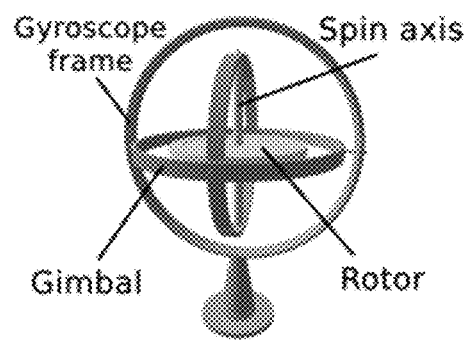
FIG. 3A shows a mechanical gyroscope in accordance with an exemplary embodiment.

FIG. 3A shows a mechanical gyroscope in accordance with an exemplary embodiment. In an embodiment of the system the positioning module comprises a gyroscope.

In an embodiment, a Micro-Electro-Mechanical Systems (MEMS) gyroscope and Arduino® MPU6050 may be utilized in the positioning module to keep/adjust the mounted ultrasonic sensors parallel to the ground. The MPU6050 is an accelerometer-gyroscope chip that has six axes sense, and several commercial libraries are available for the software code to be used with the electronic package.

Figure 3B:
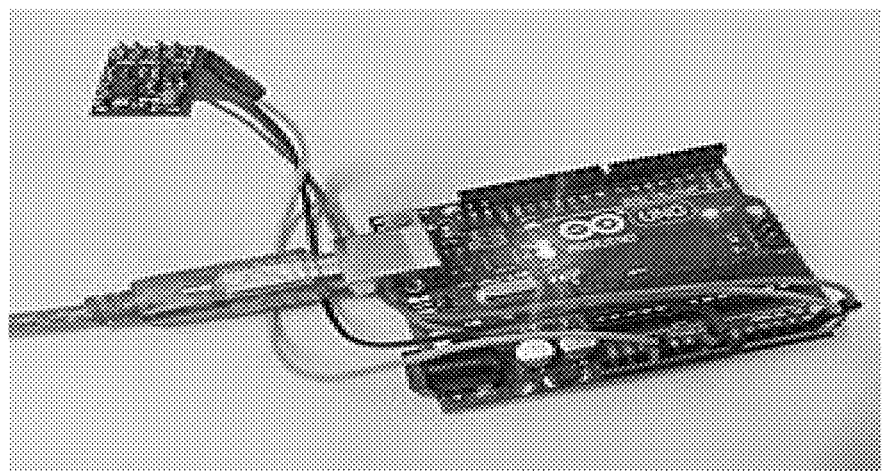
FIG. 3B shows a digital or Micro-Electro-Mechanical Systems (MEMS) sensor connected to an Arduino board in accordance with an exemplary embodiment.

FIG. 3B shows a digital or Micro-Electro-Mechanical Systems (MEMS) sensor connected to an Arduino® board in accordance with an exemplary embodiment. In an embodiment, the MPU6050 is a Micro-Electro-Mechanical Systems (MEMS) sensor that integrates a 3-axis gyroscope 218 (shown in FIG. 2A) and a 3-axis accelerometer 224 (shown in FIG. 2B) into a single chip, along with a Digital Motion Processor (DMP) for real time motion processing. The MPU6050 measures angular velocity (rate of rotation) along three axes (X, Y, and Z) using its gyroscope, linear acceleration along the same three axes using its accelerometer, and ambient temperature using its on-chip temperature sensor 226 (shown in FIG. 2B). This combination enables the sensor to capture motion dynamics such as orientation, tilt, and movement, making it suitable for motion detection and control. MEMS sensors are sensitive to temperature variations, which can cause drifting or inaccuracies in their readings due to changes in material properties and electronic behavior. The temperature sensor provides real time temperature data, enabling temperature compensation algorithms to correct for such variations. The MEMS sensor measures acceleration, velocity, orientation, displacement and many other motion-related parameters of a system or object to which it is integrated or coupled to. This module also has a Digital Motion Processor (DMP), which is powerful to perform complex calculations and thus free up the work for Microcontroller.

The MEMS gyroscope working is based on the Coriolis effect. The Coriolis effect states that when a mass moves in a particular direction with velocity and an external angular motion is applied to it, a force is generated and that causes a perpendicular displacement of the mass. The force that is generated is called the Coriolis force and the phenomenon is known as the Coriolis effect. The rate of displacement will be directly related to the angular motion applied/experienced.

The MEMS gyroscope comprises a set of four proof mass and is kept in a continuous oscillating movement. When an angular motion is applied, the Coriolis effect causes a change in capacitance between the masses depending on the axis of the angular movement. This change in capacitance is sensed and then converted into a reading. The measured data is fed into the control system embedded in the gyroscope module/model to calculate or determine the necessary adjustment in order to maintain the orientation. The actuator motor in the gyroscope is activated to counteract the tilting motion with the necessary adjustment to keep the mounted ultrasonic sensors parallel to the ground.

The 3-axis gyroscope works on the principle of Coriolis acceleration, In MEMS gyroscopes, fork-like structures may be formed using microfabrication techniques to create vibrating masses, that are in constant back and forth motion. They are held in place using piezoelectric crystals. Whenever this arrangement is tilted, the crystals experience a force in the direction of inclination. This is caused as a result of the inertia of the moving fork. The crystals thus produce a current in consensus with the piezoelectric effect, and this current is amplified. The details of working of the gyroscope and measurement of the tilt can be further accessed at: https://docs.sunfounder.com/projects/ultimate-sensor-kit/en/latest/components_basic/05-component_mpu6050.html The gyroscope measures the rotational rate around its axis, detecting any tilting motion and producing a current proportional to the tilt relative to the parallel to ground position. The measured data is fed into the control system embedded in the gyroscope package to calculate the necessary adjustment to maintain the orientation, and actuator motor in the gyroscope is activated to counteract the tilting motion and keeps the mounted ultrasonic sensors parallel to the ground.

The components as described in the positioning module comprising gyroscope 218, accelerometer 224, and magnetometer 222 provide a combination of sensors, which may be used for determining position and orientation adjustments using sensor fusion. Sensor fusion refers to the process of integrating data from multiple sensors to obtain a more accurate, reliable, and comprehensive understanding of an environment or system than would be possible using a single sensor alone. In an embodiment, accelerometer 224 and gyroscope 218 are used while magnetometer 222 may be an optional component.

The vibratory actuator of the haptic module converts electrical signals to mechanical vibration. This device is suitable for sensitive interactive products such as wearable smart devices. Metal Oxide Semiconductor (MOS) amplification drive can be directly controlled by the digital port of the processor, and it is used to regulate the vibration strength of the through Pulse Width Modulation (PWM). According to an embodiment, the specifications of the vibratory actuator may be having a Rated Voltage: 5.0V DC; a Working Voltage: DC 3.0-5.3V; a Rated Speed: 9000 Revolutions Per Minute (RPM); a Rated Current: 60 mA; a Starting Current: 90 mA; a Starting Voltage: DC 3.7V.

In an embodiment the ultrasonic sensing module comprises an ultrasonic emitter and an ultrasonic detector. In an embodiment the ultrasonic emitter is operable to emit an ultrasonic signal, and the ultrasonic detector is operable to receive a signal reflected from the obstacle. In an embodiment the haptic feedback is provided to the user when strength of the signal is above a set threshold limit. Threshold values/limits are set to determine when feedback, such as haptic alerts, should be triggered based on sensor data, and these values can vary depending on the type of sensor and the intended user experience. For instance, in an obstacle detection system using ultrasonic sensors, a threshold value might be set at a distance of 100 feet, meaning that if an object is detected within this range (e.g., 80 meters), haptic feedback is activated to alert the user. Similarly, for infrared sensors, the threshold could be based on the strength of the reflected signal, such as 70% signal strength, which would trigger feedback when the reflection is strong enough to indicate a nearby object. Tactile feedback is activated when the strength of a signal, such as a sensor's output or detection level, exceeds a predetermined threshold. This threshold limit is set to ensure that the user receives feedback when an obstacle or relevant environmental factor is within a certain proximity or intensity. For example, in the current navigation system for hearing-impaired users, the system might use sensors (such as ultrasonic or infrared sensors) to detect objects. When an obstacle is detected with sufficient proximity or strength of the signal (indicating a near or significant object), the system triggers a haptic device, like a vibrating motor, to alert the user. This prevents unnecessary or distracting feedback when the signal strength is too weak, ensuring that feedback is provided when it is most relevant, such as when an obstacle is close or approaching fast. This feedback system provides or brings attention to situations that require action. In an embodiment the haptic feedback is selectively provided on a right side of the user when the location of the obstacle is determined to be on the right side of the user, and on a left side of the user when the location of the obstacle is determined to be on the left side of the user. In an embodiment the haptic feedback is selectively provided on a front right side of the user when the location of the obstacle is determined to be on the right side of the user, and on a front left side of the user when the location of the obstacle is determined to be on the left side of the user. In another embodiment the haptic feedback is selectively provided on a back right side of the user when the location of the obstacle is determined to be on the right side of the user, and on a back left side of the user when the location of the obstacle is determined to be on the left side of the user. The smart helmet may further provide a different haptic feedback for a different type of obstacle.

In one example, the haptic module comprising vibratory actuator 208, 210 may comprise a haptic signal generator, such as an eccentric rotating mass (ERM) motor, a linear resonant actuator (LRA), a piezo-haptic actuator, and so forth. In one example, the haptic module comprising vibratory actuator 208, 210 may comprise a plurality of one or more individual haptic signal generators. The apparatus 200 may further include a processor 216 configured to perform various operations for providing haptic feedback to the user based upon a detection of an obstacle, as described herein. The haptic module comprising vibratory actuator 208, 210 may comprise vibration actuators, in which case the haptic feedback may be tactile or in the form of vibrations that are felt by the user to alert the user of the surrounding obstacles. The haptic module comprising vibratory actuator 208, 210 may be positioned across from the ultrasonic sensing module 204, 206. When the strength of the signal reflected from an obstacle surpasses a set threshold limit, the haptic module comprising vibratory actuator 208, 210 alerts the user by providing haptic feedback. The set threshold may be a predetermined threshold due to the Doppler effect caused by an approaching obstacle or hazard. The threshold may be based on the range of the ultrasonic detector and the ultrasonic emitter. The threshold may be further based on the time taken from the signal to travel from the ultrasonic emitter to the obstacle and then back to the ultrasonic detector, and the smart helmet provides haptic feedback to the user so that the user may take necessary action and the safety of the user is enhanced. The corresponding vibration actuator may be triggered, alerting the user to the potential danger. The haptic feedback may be based on the location of the obstacle with respect to the user. The haptic feedback may be selectively provided on a right side of the smart helmet 202 when the location of the obstacle is determined to be on a right side of the user, and on a left side of the smart helmet 202 when the location of the obstacle is determined to be on a left side of the user. The right side of the smart helmet may correspond to right side of the user and the left side of the smart helmet may correspond to the left side of the user. In another example, haptic signals having different patterns may be used to distinguish between different detected objects.

In one example, when an object is detected via the ultrasonic sensing module 204, 206, a haptic signal may be provided, where the haptic signal corresponds to the object that is detected. For instance, in an example, a pattern of the haptic signal may be based upon a distance to the object that is determined (e.g., determining a distance to a detected object using the ultrasonic sensing module 204, 206). For example, the haptic signal may comprise a sequence of pulses, where a time between pulses may be shorter, the closer the detected object, and may be longer, the further away the detected object. In another example, the intensity of the haptic signal, e.g., an amplitude and/or a force of a pulse generated by the haptic actuator may be increased when the object is detected at a closer distance, as compared to when the object is detected further away.

It should be noted that variations of apparatus 200 may also be implemented in accordance with the present disclosure. In an example, a wearable unit may have less than a one-to-one correspondence between ultrasonic emitter/detector pairs and haptic actuators. For instance, a different wearable unit may have one haptic module comprising a vibratory actuator for every three ultrasonic emitter/detector pairs. In one example, emitter/detector pairs and haptic modules comprising vibratory actuators may be decoupled. In other words, these components may not be affixed to one another but may comprise standalone components that may be coordinated by the processor 216. Thus, additional changes of a same or a similar nature may be implemented in various wearable units in accordance with the present disclosure.

In an embodiment, the apparatus may further comprise a communication module that establishes a connection and communicates with a mobile device. The communication module may be a GSM module for communicating with one or more GSM enabled devices. In another embodiment, the communication module may be a Bluetooth module, for communicating with one or more Bluetooth enabled devices. The communication module may automatically transmit real time data and just-in-time data. In an embodiment, the mobile device may be at least one of a smart phone, a wristwatch, and a portable computing device.

In an embodiment, the system may further comprise a communication module that establishes a connection and communicates with a mobile device. In one embodiment, the communication module may be a GSM module for communicating with one or more GSM enabled devices. In another embodiment, the communication module may be a Bluetooth module, for communicating with one or more Bluetooth enabled devices. The communication module may automatically transmit real time data and just-in-time data. In an embodiment, the mobile device may be at least one of a smart phone, a wristwatch, and a portable computing device, wherein the mobile device comprises an application interface, wherein the data received from the communication module is stored in a database, and wherein the application interface is operable to retrieve the data from the database and present the data for future reference. The communication module may further provide a graphical representation of the data by mapping the presence, the distance and the location of the obstacle, and a current location of the user.

Additional embodiments relate to one or more methods comprising: transmitting automatically, via a communication module, in real time the data to a mobile device, determining, via a global positioning satellite (GPS) system, a current location of the user, and providing, via the communication module, a graphical representation of the data by mapping the presence, the distance and the location of the obstacle, and the current location of the user, to the mobile device. Another embodiment relates to recording, via one or more cameras, a first data from the surroundings, and transmitting, via the communication module, the first data to the mobile device. In an embodiment, the system further comprises one or more cameras, wherein the cameras are operable to scan and record a first data from the surroundings. In an embodiment, the communication module is operable to transmit the first data to the mobile device.

Figure 3C:
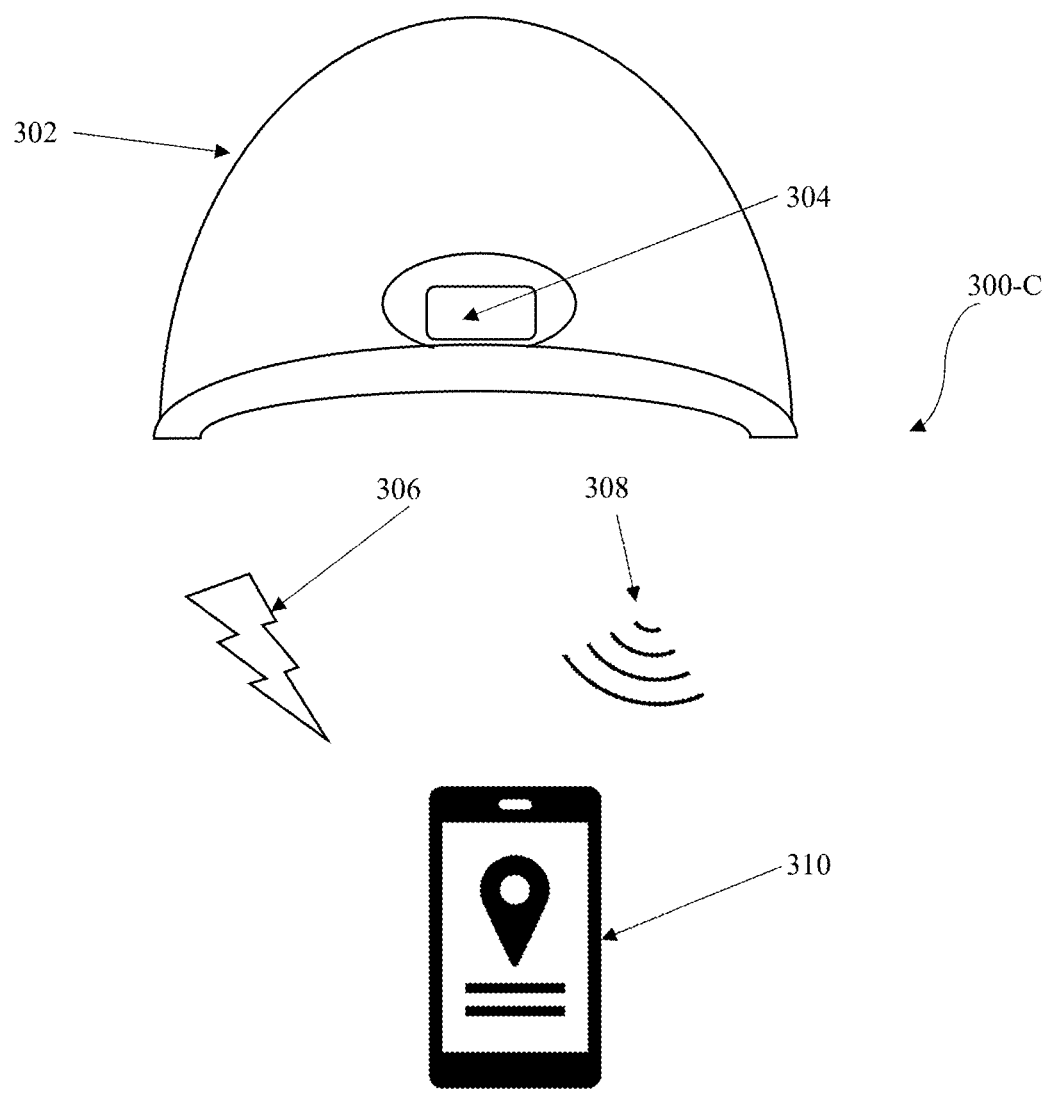
FIG. 3C illustrates an example system related to the present disclosure.

FIG. 3C is a schematic representation of system 300-C of communication of an apparatus 302 according to an exemplary embodiment. In an embodiment of the disclosure, the apparatus, a smart helmet 302 may comprise a communication module 304, which may further comprise a GSM module and a Bluetooth module. The communication module 304 may transmit data via one or more telecommunication networks which can be, by way of example and not by way of limitation, a mobile/cellular phone network, a GSM network 306, a Code-Division Multiple Access (CDMA) network, a radio network, a Bluetooth network 308, the Internet, a local area network, a private area network, Long Term Evolution (LTE) network, a service network, and a core network, e.g., an IP Multimedia Subsystem (IMS) core network, and/or the like. Such networks could facilitate apparatus 302 to send communication to a mobile device 310 or cellular telephone, via the network (e.g., Internet). The mobile device 310 may be one of a cellular telephone, a smart phone, a tablet computing device, a laptop computer, a pair of computing glasses, a wireless enabled wristwatch, or any other wireless and/or cellular-capable mobile telephony and computing device. The smart phone includes a Subscriber Identity Module (SIM) card and a Wi-Fi receiver and Wi-Fi transmitter (or alternatively includes a Wi-Fi transceiver). The mobile device is configured to use any of the cell phone signaling technology (e.g., GSM, CDMA, LTE, or other suitable wireless methods). The communication module 304 may further transmit the data regarding the presence, the distance, and the location of the obstacle to the mobile device 310. The mobile device 310 may include an application interface (App). The data received from the communication module 304 may be stored in a database on the mobile device 310 or in a cloud application. The application interface may retrieve the data from the database and present the data to provide meaningful information for future reference to the user. In an example, the smart helmet seamlessly integrates with smart phones and other smart devices, allowing cyclists to answer calls, access navigation apps through voice commands or simple gestures, promoting a hands-free and distraction-free riding experience. In one example, the mobile device 310 may include a wireless transceiver for IEEE 802.11 based communications, IEEE 802.15 based communications, or the like, where apparatus 302 may be similarly equipped. Alternatively, or in addition, apparatus 302 may connect to the mobile device 310 via one or more wired connections. Apparatus 302 may be configured for operation via network connection of mobile device 310 to a network-based server. For an analog communication connection, the video, audio, and/or other signals will be transmitted from the apparatus by use of available analog transmission frequencies. For example, these analog communication signals can be Radio Frequency (RF) signals of a given frequency such as, e.g., approximately 2.4 GHz or 5.8 GHz. In one embodiment, apparatus 302 includes an antenna for use in transmitting signals from the smart helmet. However, in another embodiment, the antenna is not necessarily visible to the observer and may be integrated with, built into, and/or flush with the smart helmet. Bluetooth network 308 can be a transceiver able to permit near field communication. Bluetooth network 308 can permit short-wavelength radio transmissions in the Industrial, Scientific and Medical (ISM) band 2400-2480 MHz. Bluetooth network 308 can be communicatively linked to a Bluetooth device (e.g., mobile phone), permitting traditional and/or proprietary actions to be enabled. In one instance, Bluetooth network 308 can be utilized to communicate with proximate devices (e.g., mobile phone) to perform voice operations including, but not limited to, a call to emergency services, text messaging a predefined contact, and the like. Communication module 304 can include traditional and/or proprietary communication protocols. Protocols can include but are not limited to Hypertext Transport Protocol (HTTP), Transport Control Protocol (TCP), Internet Protocol (IP), Session Initiated Protocol (SIP), Real time Transport Protocol (RTP), Secure Sockets Layer (SSL), and the like.

In one example, the LTE network comprises an access network and a core network. For example, LTE network may comprise an evolved Universal Terrestrial Radio Access Network (eUTRAN) and an evolved packet core (EPC) network. The eUTRANs are the air interfaces of the 3rd Generation Partnership Project (3GPP) LTE specifications for mobile networks. In one example, the EPC network provides various functions that support wireless services in the LTE environment. In one example, the EPC network is an Internet Protocol (IP) packet core network that supports both real time and non-real time service delivery across an LTE network, e.g., as specified by the 3GPP standards. In one example, all eNodeBs, in the eUTRAN are in communication with the EPC network. In operation, LTE user equipment or user endpoints (UE), such as apparatus 100, may access wireless services via the eNodeBs located in eUTRAN. It should be noted that any number of eNodeBs can be deployed in an eUTRAN. In the EPC network, network devices Mobility Management Entity (MME) and Serving Gateway (SGW) support various functions as part of the LTE network. In one embodiment, SGW routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network may comprise a Home Subscriber Server (HSS) that contains subscription-related information (e.g., subscriber profiles), performs authentication and authorization of a wireless service user, and provides information about the subscriber's location. The EPC network may also comprise a packet data network (PDN) gateway which serves as a gateway that provides access between the EPC network and various data networks, e.g., service network, IMS core network, and the like. The packet data network gateway is also referred to as a PDN gateway, a PDN GW or a PGW.

In one example, a service network may comprise one or more devices for providing services to subscribers, customers, and/or users. For example, a telecommunications service provider network may provide a cloud storage service, web server hosting, and other services. As such, the service network may represent aspects of telecommunications service provider network where infrastructure for supporting such services may be deployed. In the example, the service network may include an application server (AS). In one example, an application server may comprise a computing system, such as a computing system specifically configured to perform various steps, functions, and/or operations in support of systems for providing a haptic signal based upon a detection of an object, in accordance with the present disclosure. In one example, service network may also include a database (DB), e.g., a physical storage device integrated with application server (e.g., a database server), attached or coupled to the application server, to store various types of information in support of systems for providing a haptic signal based upon a detection of an object, in accordance with the present disclosure. In one example, networks may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks may include different types of networks. In another example, the other networks may be the same type of network. In one example, apparatus 100 may be connected to mobile device 310 via PDN GW, and/or via PDN GW and IMS core network.

In an embodiment, the system may be expanded to include additional networks, such as network operations center (NOC) networks, additional eUTRANs, and so forth. The system may also be expanded to include additional network elements such as border elements, routers, switches, policy servers, security devices, gateways, a content distribution network (CDN) and the like, without altering the scope of the present disclosure. In addition, the system may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN, EPC network, service network, and IMS core network are omitted for clarity, including gateways or border elements providing connectivity between such networks, internal routers within an EPC network, and so on.

In an embodiment the apparatus may further comprise a global position satellite (GPS) system operable to determine a current location of the user. Global position satellite system (GPS) can be any navigation system that can provide location and time. GPS systems can include traditional and/or proprietary functionality. The communication module is further operable to provide a graphical representation of the data by mapping the presence, the distance and the location of the obstacle, and the current location of the user.

Figure 3D:
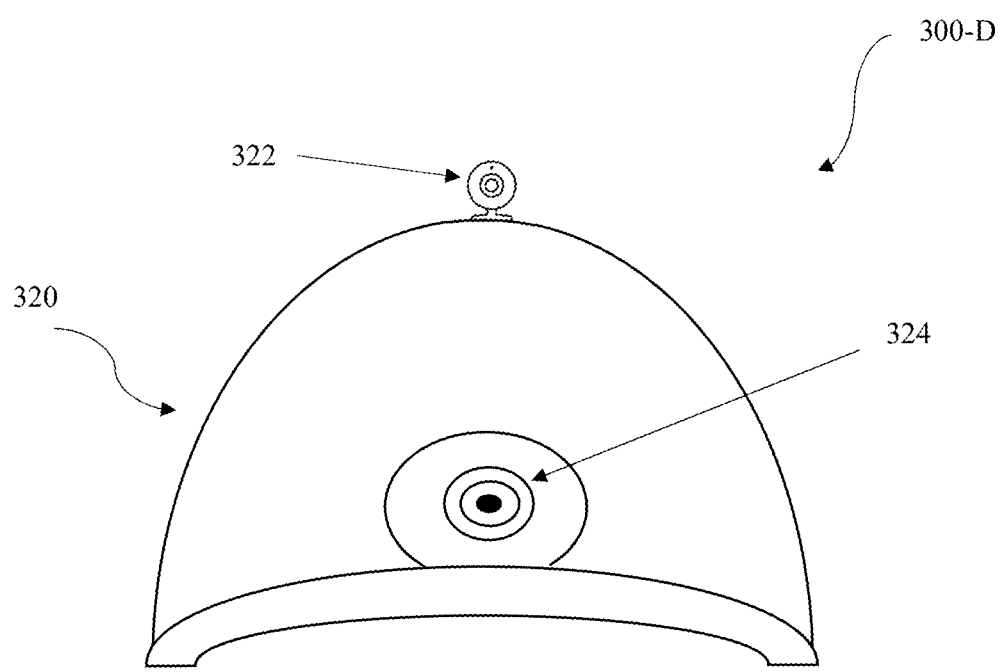
FIG. 3D shows a schematic of a smart helmet in accordance with an exemplary embodiment.

FIG. 3D is a schematic representation 300-D of an apparatus according to one exemplary embodiment of the present disclosure. In an embodiment of the disclosure, the apparatus, a smart helmet 320 may comprise a first camera 322 (may be a top mounted camera), and a second camera 324 (may be a front-mounted camera). In another embodiment, the camera 324 may be a back-mounted camera or an additional camera may be used as a back-mounted camera. In an embodiment, the camera 322, 324, or a micro video camera, may be a closed-circuit television camera, attached to the smart helmet allowing the user of the smart helmet to make a visual record from their point of view (POV), while keeping their hands and vision free. The smart helmet camera(s) 322, 324 may be Complementary Metal-Oxide-Semiconductor (CMOS) type and/or charge-coupled device (CCD) type. Cameras 322, 324 may be connected to a video recording device with video input capability, such as a hand-held camcorder, or a digital video recorder. CCD helmet cameras are based upon the charge-coupled device (CCD) image sensor. They typically operate on 12 V DC power and output an analog type of signal. CMOS helmet cameras are based upon the complementary metal-oxide-semiconductor (CMOS) image sensor. They typically operate on 5 V DC and draw very little power.

According to an embodiment, the camera may be a forward-facing/forward mounted camera, wherein a camera may be mounted on the smart helmet. In an embodiment, the smart helmet design may include cylindrical bullet cameras. In an embodiment, the smart helmet may include one or more rear-facing cameras. The rear-facing camera films and records everything that approaches the smart helmet user from behind. In an embodiment, the smart helmet may include one or more side facing cameras. The one or more cameras may be mounted on the smart helmet or securely attached to a wearable device worn by the user. In an embodiment, at least one of the cameras is a camera that can capture 3-dimensional (3D) images. For a 3D camera, the camera lenses could be, for example, stereo lenses to capture 3D images. In an embodiment, any of the cameras can be removably mounted via connectors to the smart helmet body or can be welded on the smart helmet body. In another embodiment, any of the cameras can be embedded in the smart helmet body.

In another embodiment the apparatus may comprise one or more cameras, wherein the cameras are operable to scan and record a first data from the surroundings, wherein the communication module transmits the first data to the mobile device. A camera can include, but is not limited to, an image camera, a video camera, a night vision camera, and the like. In an embodiment, at least one of the cameras is a camera that can capture 3-dimensional (3D) images. For a 3D camera, the camera lenses could be, for example, stereo lenses to capture 3D images. In another embodiment, the cameras can be removably mounted via connectors to smart helmet 320 or can be welded on smart helmet 320. In yet another embodiment, any of the cameras can be embedded in an internal lining of the smart helmet 320. By way of example and not by way of limitation, a camera embedded in smart helmet 320 would typically be a lightweight, small-sized camera such as those cameras used (or those similar to cameras used), for example, in medical endoscopy imaging or other imaging technologies. In an embodiment, the cameras included with the smart helmets disclosed herein can record high-definition images such as, by way of example and not by way of limitation, approximately 1080p resolution. In other embodiments, the cameras can record alternative lower quality formats such as, by way of example and not by way of limitation, approximately 720p, 480p, or other resolution values, in order to achieve cost saving and/or bandwidth saving requirements as required by a user. A microphone to record the audio of the surroundings of smart helmet 320 can also be optionally used to accompany the cameras that capture images and/or record video. However, in other embodiments, the microphone can be omitted for purposes of achieving lower costs or less complex processing circuitry. Further, the camera can be the device that records images (e.g., JPEG, GIF) that can be stored directly, transmitted to another location, or both.

In an embodiment of the disclosure, the apparatus may include one or more cameras. The cameras are operable to scan and record a first data from the surroundings. The first data may include a video recording, a picture, or a series of pictures, and/or the like, of the surroundings of the user. In an example, the communication module is operable to transmit the first data to the mobile device. The number of cameras on the apparatus can vary. By way of example and not by way of limitation, the apparatus can include a single camera such as the backward facing camera which captures a single-wearer point of view, presumably from a backward-looking vantage point. In an example, the smart helmet features a heads-up display (HUD) that provides real time information, such as speed, navigation directions, and important notifications, directly within the cyclist's line of sight, ensuring they remain informed without the need to divert attention from the road. The heads-up display can be a transparent display which can present data without requiring the user to look away from a selected viewpoint. The display can be presented within a visor (e.g., embedded display), presented within a display proximate to apparatus 100, and the like. Display technology can include liquid crystal display (LCD), liquid crystal on silicon (LCoS), digital micro-mirrors (DMD), organic light-emitting diode (OLED), optical waveguide, scanning laser, and the like. Display can present relevant information in real time or near real time. In an embodiment, if the processor 216 includes (or is embodied as) a digital control subsystem, then the digital control subsystem will receive the digital signals from each of the attached devices (e.g., camera, microphone, and/or global position satellite (GPS) system) and may subsequently alter or multiplex the digital signals before transmission. By way of example and not by way of limitation, examples of such alterations of digital signals includes (1) stitching the various camera-captured video data together to provide a single video stream that emulates a 360-degree video and/or (2) transcoding the video data from the format provided by the cameras to a network transmittable encoding format. By way of example and not by way of limitation, a network transmittable encoding format technique can be MJPEG ((Motion JPEG, Motion Joint Photographic Experts Group) a video compression format where each video frame is compressed as a separate JPEG image). Video encoding and transcoding hardware may be included as part of the processor 216.

In addition, examples of the present disclosure are not limited to the context of a long-term evolution (LTE)-based network. For example, the teachings of the present disclosure can be applied to other types of wireless networks (e.g., a 2G network, a 3G network, a 5G network and the like, an IEEE 802.11 based network, or a future technology or standard-based network). In yet another example, apparatus 302 may be loaded with applications which may collectively coordinate its configuration parameters, e.g., without the involvement of a network-based server, such as an application server. In such an example, apparatus 302 may communicate with one another using peer-to-peer communications, e.g., by establishing an IEEE 802.11 based and/or 802.15 based ad-hoc wireless network, or by using the telecommunications service provider network simply as a communication medium. Thus, these and other modifications are all contemplated within the scope of the present disclosure.

Figure 3E:
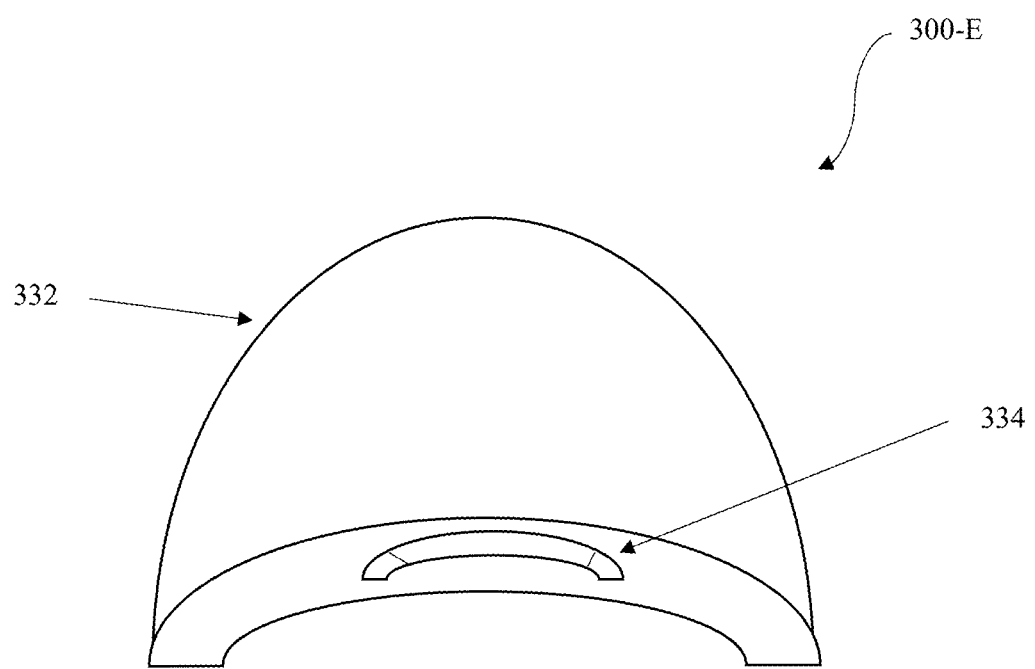
FIG. 3E shows a schematic of a smart helmet in accordance with an exemplary embodiment.

FIG. 3E is a schematic representation 300-E of an apparatus according to one exemplary embodiment of the present disclosure. In an embodiment of the disclosure, the apparatus, a smart helmet 332 may comprise a GPS tag 334. Additionally or alternatively, smart helmet 332 can optionally include a global position satellite (GPS) system which can be, by way of example and not by way of limitation, a GPS receiver for tracking the current position of smart helmet 332 (i.e., current position data of smart helmet 332). The GPS system can include traditional and/or proprietary functionality. The GPS on the smart helmet may provide real time tracking by web and phone app. In an embodiment, the smart helmet 332 may include a position tracking system which can be a GPS receiver for tracking the current position of the smart helmet, i.e., current position data of the smart helmet. The GPS signals are received from the GPS tracking system and sent to the processor which determines the method for transmitting the GPS signal from the smart helmet. A GPS receiver may be a single, small chip (IC) when used in embedded applications. The chip is typically mounted on a board. When the chip is powered by voltage and receives satellite signals, the chip emits a stream of NMEA (usually) encoded position data. In an aspect, the processor is configured to process that position data in various methods. In an example, the processor may transmit that position data as part of the data stream.

The GPS signals that are received from the GPS system and sent to the communication module 304, in turn, can determine the method for transmitting the GPS signal from apparatus 302, 332 to a mobile device. The communication module 304 may further provide a graphical representation of the data by mapping the presence, the distance and the location of the obstacle, and the current location of the user, and transmit it to the mobile device. In an example, the graphical representation of the data including the presence, the distance and the location of the obstacle, and the current location of the user may be presented on the application interface for future reference of the user. In an example, the GPS system may utilize the haptic module comprising vibratory actuator 208, 210 and the like, to permit turn-by-turn directions, navigation customization, and the like to the user.

In an embodiment, the processor 216 includes the components for mobile computer functions for digital systems or the analog signal processing unit for analog signals. The processor 216 collects and processes the video, audio, GPS, and/or telemetry data, and sends these data from the smart helmet 202, 332 to a destination such as, by way of example and not by way of limitation, a local base station. By way of example and not by way of limitation, the processor 216 can format the video, audio, GPS, and/or telemetry data into digital data streams or data packets which the processor 216 can then stream as digital signals via the network. By way of example and not by way of limitation, the processor 216 can modulate the video, audio, GPS, and/or telemetry data with a carrier wave of a given frequency and can transmit the modulated signal to the local base station. In an aspect, the processor 216 is configured to process that position data in various methods. By way of example and not by way of limitation, the processor 216 transmits that position data as part of the data stream. In a scenario, a collision notification can be presented within a HUD when a collision is detected by the smart helmet. The notification can be associated with an emergency action, collision information, and the like. For example, the emergency action can include automatically calling an emergency contact in response to the collision. It should be appreciated that pre-event/post-event sensor information can be optionally presented, persisted, and the like. A scenario can be associated with an Advanced Automatic Collision Notification (AACN) system, a pre-collision system, a Vehicular Emergency Data Set, and the like.

It should be appreciated that smart helmet 202 can include basic computing components including, but not limited to, one or more processors, one or more buses, a user interface, and the like. It should be understood that smart helmet 202 can be constructed from commercial off-the-shelf (COTS) electronics permitting smart helmet 202 cost to be competitive. It should be appreciated that smart helmet 202 can include optional components such as a vibration motor, a Light Emitting Diode (LED) indicator, and the like. It should be understood that apparatus 100 can include full face helmets, motocross helmets such as helmets used for sport or off-road riding, modular helmets, open face helmets, and the like. In an embodiment, smart helmet 202 can optionally include a telemetry subsystem which is a component for taking additional measurements from apparatus 100. In an embodiment, the telemetry subsystem will capture telemetric data that includes velocity information of apparatus 100. In another embodiment, the telemetry subsystem is configured with a signal generating system for tracking at least one or some of the following telemetric data: the smart helmet's velocity, acceleration, angles at which the smart helmet is pitched, total time travelled between fractional distances, and/or other information. In an embodiment, a number of separate chips (ICs) or/and devices together will collect different telemetric data, and the processor 216 polls these devices for the various telemetric data. In another embodiment, the telemetry subsystem includes a single chip for tracking a particular telemetric data such as, by way of example and not by way of limitation, the velocity of the smart helmet. Cell phone tethering might be useful where the cameras on the smart helmet can communicate to the Internet-based servers using Wi-Fi to connect to a mobile device and then the mobile device transmits the signals across the Internet.

Figure 3F:
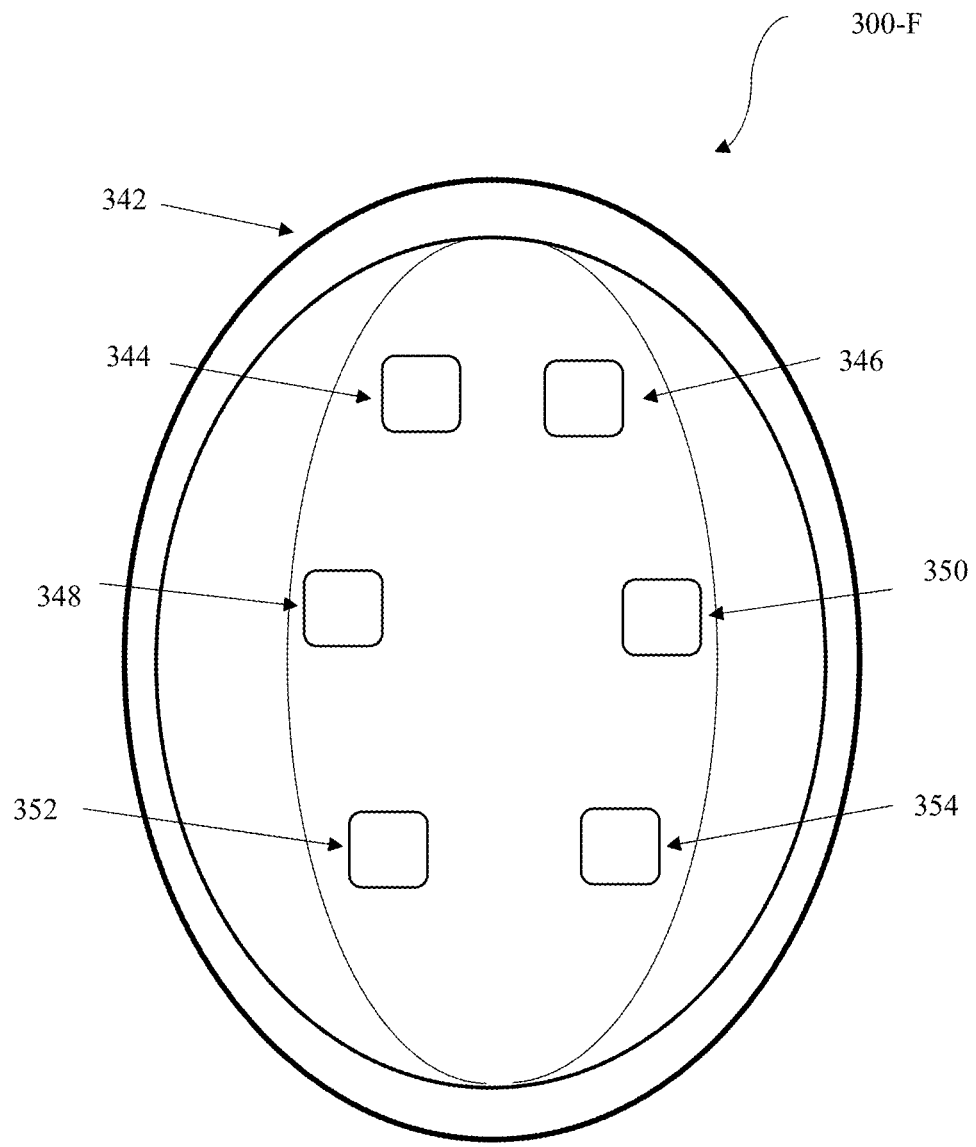
FIG. 3F shows a schematic of a smart helmet in accordance with an exemplary embodiment.

FIG. 3F is a schematic representation 300-F of an apparatus according to one exemplary embodiment of the present disclosure. FIG. 3F shows the inside of the smart helmet 342. The smart helmet 342 may comprise impact sensors 344, 346, 348, 350, and trigger safety mechanism 352, 354 embedded on the inside lining of the smart helmet. The placement of the impact sensors 344, 346, 348, 350, and trigger safety mechanism 352, 354 may be different in different embodiments. In an additional embodiment, the user may be riding a vehicle, such as a two-wheeler vehicle, a bicycle, or a tricycle. The apparatus may further comprise a three-axis accelerometer operable to detect changes in motion of the user. In another embodiment, the apparatus may further comprise impact sensors 344, 346, 348, 350 operable to detect an impact, wherein the impact is caused by one or more of a collision of the obstacle with the vehicle the user is riding, a collision of the vehicle with the obstacle, and a fall of the user. On detecting the impact, the communication module may transmit a communication comprising the current location of the user to an emergency service. In an additional embodiment, the apparatus may further comprise a trigger safety mechanism 352, 354 operable to detect a potential collision between the obstacle and the vehicle the user is riding, wherein the trigger safety mechanism upon detecting the potential collision, provides a first haptic feedback via the haptic module comprising the vibratory actuator, wherein the first haptic feedback alerts the user to activate an anti-skid mechanism.

Impact sensor 344, 346, 348, 350 may be a device which indicates whether a physical shock or impact has occurred. In an embodiment, the sensors may detect a crash and call for assistance. It may also be referred to as a shock detector, shock indicator, or impact monitor. In an embodiment, impact sensors may have a binary output (go/no-go) and are sometimes called shock overload devices. Impact sensors may indicate if a significant impact has occurred. This helps determine the need for follow-up actions. Head Impact Telemetry System (HITS) is a hardware and software system intended as a shock detector and logger, wherein the hardware is embedded in helmets and transmits data to a computer. The impact sensors 344, 346, 348, 350, and trigger safety mechanism 352, 354 embedded in the smart helmet or the wearable device may be responsive to acceleration, orientation, position, velocity, and have the ability to sense the presence of another object or device in the vicinity. These integrated sensors in the padding can measure and integrate the directional and rotational impact force into real time data that can be interpreted and organized. These sensors can sense an impending impact with another moving object or stationary object or stable platform. The sensors, embedded in the impact material, in another embodiment could have GPS (Global Positioning System) capability, providing location and active tracking capabilities. A shock absorber mechanism can also dampen impact. The basic function of the shock absorber is to absorb and dissipate the impact kinetic energy to the extent that accelerations are reduced to a tolerable level. The amount of damping produced is proportional to velocity. This means the damper works like a dynamic spring; it produces force only when it is moving.

According to an embodiment, trigger safety mechanism 352, 354 or vibration data logger is a measurement instrument that is capable of autonomously recording shocks or vibrations over a defined period of time. Digital data is usually in the form of acceleration and time. The shock and vibration data can be retrieved (or transmitted), viewed and evaluated after it has been recorded. The trigger safety mechanism may comprise sensors such as accelerometers, storage media, a processor and power supply. The sensors measure and store shocks either as the entire waveform, summary data, or an indication of whether a threshold value is observed. Some devices have accelerometers built into the unit while others can use external accelerometers. The processor processes the measured data and saves it on the storage media together with the associated measurement times. This allows the measurement data to be retrieved after the measurements have been completed, either directly on the logger or via an interface to a computer. Some have a Radio-Frequency Identification (RFID) interface. Software is used to present the measured data in the form of tables or graphs and provides functions for the evaluation of the measurement data. The shock and vibration data may either be recorded continuously over a defined time period or on an event-driven basis where the recording of data is determined by certain criteria. Employing such an event-based measurement method allows the recording of specific shocks that exceed a critical length of time or strength. Some have wireless capabilities such as Bluetooth transmissions to smartphones.

Embodiments of the present disclosure could use a variety of types of impact reduction mechanisms to reduce impact and dissipate the impact force. Examples include springs, pistons, gases, fluids, and polymers. Various configurations and combinations of the padding and impact materials can be included in the embodiments.

In an embodiment, the system may further comprise impact sensors operable to detect an impact, wherein the impact is caused by one or more of a collision of the obstacle with a vehicle the user is riding, a collision of the vehicle with the obstacle, and a fall of the user. In an embodiment, upon detecting the impact, the communication module may transmit a communication comprising a current location of the user to an emergency service. In an embodiment, the system further comprises a trigger safety mechanism operable to detect a potential collision between the obstacle and a vehicle the user is riding. In an embodiment, the trigger safety mechanism upon detecting the potential collision, is operable to provide a first haptic feedback via the haptic module comprising the vibratory actuator. In an embodiment, the first haptic feedback is operable to alert the user to activate an anti-skid mechanism.

In an embodiment of the disclosure, the user is riding a vehicle. The vehicle may be a two-wheeler vehicle. In one example, the smart helmet 202 may include or may be in communication with an accelerometer 224. An accelerometer can include a one axis accelerometer, a two-axis accelerometer, a three-axis accelerometer, and the like. The accelerometer 224 can be a device that can measure proper acceleration. The three-axis accelerometer may detect changes in motion of the user. For example, the accelerometer 224 can be a tilt sensor. In one instance, the accelerometer can be utilized to receive motion input from a user riding a vehicle, e.g., a bicycle, a two-wheeler, and/or the like. It should be appreciated that the accelerometer 224 can be utilized to detect falls, impacts, and the like. In such a case, the communication module is operable to transmit a communication comprising the current location of the user to an emergency service.

In another example, the apparatus may comprise, or may be in communication with, impact sensors to detect an impact, wherein the impact may be caused by one or more of a collision of the obstacle with the vehicle the user is riding, a collision of the vehicle with the obstacle, and a fall of the user. In case of an impact, the communication module is operable to transmit a communication comprising the current location of the user to an emergency service. In an example, the apparatus includes an impact detection system that senses and analyzes the severity of impacts. In the event of a significant impact, the smart helmet automatically sends an emergency notification to predefined contacts, providing crucial information and current location of the user, enhancing the cyclist's safety in case of incoming events.

Active and passive sensors could be embedded in the smart helmet or the wearable object that is worn by the user. The embedded sensors can be responsive to acceleration, orientation, position, velocity, and have the ability to sense the presence of another object or device in the vicinity. These integrated sensors can measure and integrate the directional and rotational impact force into real time data that can be interpreted and organized. These sensors could sense an impending impact with another moving object or stationary object or stable platform. The sensors could detect the velocity of the oncoming object or person. Sensors related to an inflatable air system or fluid system, could internally adjust the amount of air in the sealed system, or be tuned, to adapt to impacts or impending impacts to the body. Sensors could also initiate the inflation of an external air bag. Damping characteristics of any impact material/padding could be correlated in real time with the weight, speed, and impact history of the user. The embedded sensors, in another embodiment, could have GPS (Global Positioning System) capability, providing location and active tracking capabilities.

The sensors can be made of a variety of materials including nanotubes of pure carbon, graphene made of pure carbon, single electron transistors (SETs), organic molecular materials, magnetoelectric and/or magnetoelectronic materials (spintronics), organic or plastic electronics, or any other material capable of being understood by someone skilled in the art.

Embodiments of the present disclosure can also use environmental sensors that measure parameters such as air pressure, temperature, wind velocity, etc. The sensors used in an embodiment can be internally embedded as well as externally embedded, and adjacent to the skin (to measure the impact received closest to the body). Sensors can be of the physiological type or motion type and data measured can be logged and transmitted wirelessly to the wearer or remotely with visual signals, haptic signals, and auditory signals. The sensors can be responsive to thresholds or presets. The sensors can be configured to allow active tracking in real time and can be used to record data for later retrieval and analysis.

The sensors can be connected to a controller that further includes a processor as part of a smart impact reduction system. This processor or microprocessor can include a memory element to store sensor data. This stored sensor data can be used for data logging, which can facilitate evidence-driven management of the sensing and data collection process, whereby data derived from the sensors could be used to repair, modify, or alter the responsiveness of a sensor or to alter the responsiveness of a sensor and/or alter the data being recorded from a sensor or to alter the frequency at which data is being recorded from a sensor. The sensor data can also be transmitted and this transmission can be in the form of a wireless protocol such as Wi-Fi, Bluetooth, Zigbee (and related IEEE 802.15.4), a cellphone signal, or any other wireless protocol capable of being understood by someone skilled in the art. Sensor data can also be used to produce an alarm signal capable of being understood by a human, examples of which might include an audio alarm, a visual flashing red light, or a vibration or other tactile signal. The sensors can be powered by a battery, by a generator, or by an external power source that sends its power over a wired or wireless method. The sensors can be self-adjusting or active sensors that learn from data being received to better tune themselves to signals and discriminate these useful signals from other signals and background noise.

In one example, the smart helmet 202 may include or may be in communication with a trigger safety mechanism. The trigger safety mechanism, upon detecting a potential collision, may provide a first haptic feedback via the haptic module comprising the vibratory actuator that alerts the cyclist of potential collisions with surrounding objects, vehicles, or obstacles, thereby enhancing overall safety during rides. The first haptic feedback may be different from the haptic feedback by way of the intensity of vibrations felt by the user may be different, the number of vibrations that may be provided to the user may be different or the duration for which the user may receive the vibrations may be different in case of the first haptic feedback. For example, steady "on-off" pulses may be used for a haptic signal to indicate a detected object that is moving closer to the cyclist. However, alternating short and long pulses may be used to identify a detected object that is moving away from the cyclist and so on. The first haptic feedback may alert the user to activate an anti-skid mechanism of the vehicle the user is riding in response to imminent collisions, providing an additional layer of protection and minimizing the risk of accidents. In another example, the apparatus may be equipped with an intelligent braking system that automatically activates the brakes of the cyclist's bike in response to imminent collisions.

In yet another embodiment, the apparatus may further comprise a sound sensor that identifies a second data from the surroundings, wherein the apparatus upon identifying the second data provides a second haptic feedback to the user, wherein the second haptic feedback alerts the user for an appropriate action, wherein the appropriate action comprises making way for the obstacle causing the second data.

In yet another embodiment, the smart helmet 202 may include or may be in communication with a sound sensor. The sound sensor may identify a second data from the surroundings. The second data may include honking sounds of other vehicles in the surroundings of the user. Upon identifying the second data, the apparatus may provide a second haptic feedback to the user. The second haptic feedback may be different from the haptic feedback and the first haptic feedback, by way of the intensity of vibrations felt by the user may be different, the number of vibrations that may be provided to the user or the duration for which the user may receive the vibration may be different in case of the second haptic feedback. The second haptic feedback is operable to alert the user for an appropriate action, which may be making way for the vehicle causing the honking.

In one example, the apparatus may include or may be in communication with a speed sensor. In one example, the speed sensor may comprise a global positioning system (GPS) unit. In another example, the speed sensor may comprise a tachometer. For example, the smart helmet may be worn by the cyclist, with a tachometer deployed on a wheel of a bicycle. In one example, the processor 216 may include at least one transceiver for communicating with the tachometer and/or the GPS unit. For instance, the transceiver may comprise a wireless transceiver for Institute of Electrical and Electronics Engineers (IEEE) 802.11 based communications (e.g., "Wi-Fi"), IEEE 802.15 based communications (e.g., "Bluetooth," "ZigBee," etc.), or the like, where the tachometer may be similarly equipped. Alternatively, or in addition, the processor 216 may connect to the tachometer and/or the GPS unit via one or more wired connections, such as via a universal serial bus (USB) cable, a peripheral component interconnect express (PCIe) link used for high-speed data transfer between electronic components, or the like.

In another aspect, the apparatus may include a built-in turn signal feature, allowing cyclists to signal their intentions to other road users without the need for hand signals, thereby promoting better communication and reducing the likelihood of accidents. In an embodiment, the apparatus may include LED lights and ambient light sensors that adjust the brightness of LED lights based on the surrounding lighting conditions, ensuring optimal visibility, and increasing overall safety during low-light or nighttime rides. In another example, the apparatus is equipped with sensors to monitor environmental conditions, including temperature, humidity, and air quality. This data is then relayed to the cyclist, aiding in informed decision-making, and ensuring a comfortable and safe riding experience. The apparatus may further employ state-of-the-art materials designed to absorb and dissipate impact energy, providing superior protection in the event of a crash or collision, while still maintaining a lightweight and comfortable design for extended use.

In accordance with one embodiment, the apparatus includes an LED display comprising a flexible base and a two-dimensional (2D) array of LEDs installed on the flexible base. In particular, the LED display is configured to produce visual information to vehicles and pedestrians surrounding the rider, causing the rider to be able to communicate with the surrounding vehicles and pedestrians using contextual display contents including graphical, textual, and/or animated signs to thereby promote safety to the rider. In some embodiments, the processor of the designated mobile computing device is configured to provide the contextual display contents to the LED display. The graphical, textual, and/or animated signs to be displayed in the LED display may be configured and input using the designated processor/microprocessor through the communication module. For example, if a motorist is driving too close to the rider as detected by a proximity sensor, the LED display may display a "Danger" warning sign to warn the motorist to keep a further distance. On the other hand, when the rider perceives the safe road manner of a motorist, the rider may command the LED display to display a message of compliment. Preferably, the LED display may include a configuration of the 7 by 11 array optimized to strike a balance between the visible distance range of the smart helmet and power consumption of the LED display while providing a sufficiently rich contextual display content. As the number of LEDs increases beyond that of the 7 by 11 array, the power consumption becomes excessive, or each LED becomes dimmer without a proportionally increased available electrical current. The particular configuration of the 7 by 11 array also allows the optimized display of text. In one instance, smart helmet 202 can function as a black box device. In this instance, smart helmet 202 can include fire retardant materials, fire resistant materials, shock absorbing materials, and the like. That is, smart helmet 202 can protect ultrasonic sensing module 204, 206, haptic module comprising of vibratory actuator 208, 210, positioning module 212, 214 and a processor 216 during an impact, fall, fire, and the like.

Further, the apparatus may include a biological information sensor that measures the temperature related to the wearer of the smart helmet 202. However, in smart helmet 202, instead of or along with the biological information sensor, which is a temperature sensor 226, a sensor capable of detecting heart rate, pulse rate, pulse wave, blood flow rate and the like may be provided. In this manner, for example, when the wearer of smart helmet 202 has an increase in pulse rate or a sudden decrease in blood flow rate, an appropriate temperature regulation can be performed, or a notice can be given to the wearer and/or to an external server or an external emergency unit.

In one example, the apparatus may be powered by a power source. Power source can include an external power source, an internal power source, a removable power source, and the like. Power source can include, but is not limited to, a battery, an alternating current (AC) power supply, a direct current (DC) power supply, and the like. Power source can be utilized to proximate devices, and the like. Power source can conform to a Universal Serial Bus, a proprietary interface, and the like. The power source may be a rechargeable battery. The apparatus may further include a charging port to charge the battery. The apparatus may feature an efficient and long-lasting battery system, ensuring extended usage periods between charges and minimizing disruptions to the cyclist's experience, whether on short commutes or longer rides. In one example, the apparatus may include a temperature sensor to detect overheating of the apparatus and, in case of overheating, initiate a reset function of the apparatus. The user of the apparatus may be a hearing-impaired person, a deaf person, or a hard-of-hearing person.

Figure 4:
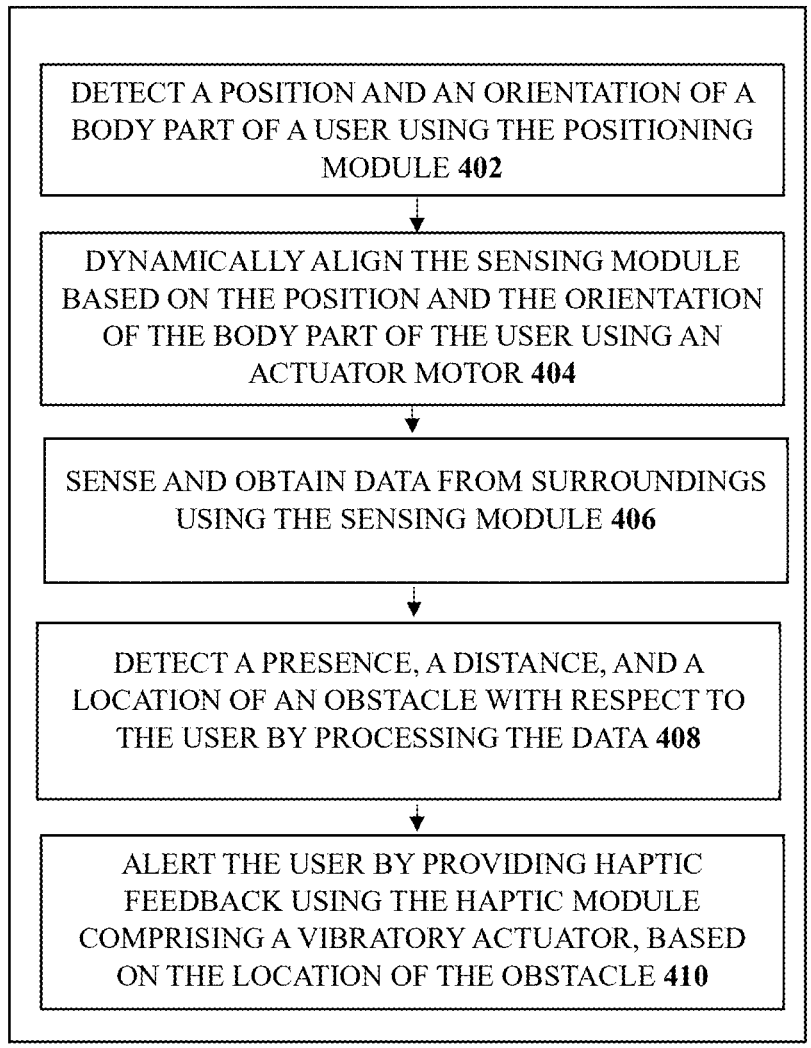
FIG. 4 shows a flow diagram for a method according to an embodiment of the present disclosure.

FIG. 4 shows a flow diagram for a method according to an embodiment. An embodiment relates to a method, comprising: detecting a position and an orientation of a body part of a user using a positioning module in step 402; dynamically aligning an sensing module based on the position and the orientation of the body part of the user using an actuator motor in step 404; sensing and obtaining data from surroundings using the sensing module in step 406; detecting a presence, a distance and a location of an obstacle with respect to the user by processing the data in step 408; and alerting the user by providing haptic feedback using a haptic module comprising a vibratory actuator, based on the location of the obstacle in step 410.

In an embodiment, the method may be operable to be integrated into a smart helmet, wherein the ultrasonic sensing module is dynamically aligned using the positioning module which includes a 3-axis gyroscope in a direction behind the user when the user wears the smart helmet. In another embodiment, the method may be operable to be integrated into a wearable object to be worn by the user, wherein the ultrasonic sensing module is dynamically aligned using the positioning module which includes a 3-axis gyroscope in a direction behind the user when the wearable object is worn by the user.

Figure 5:
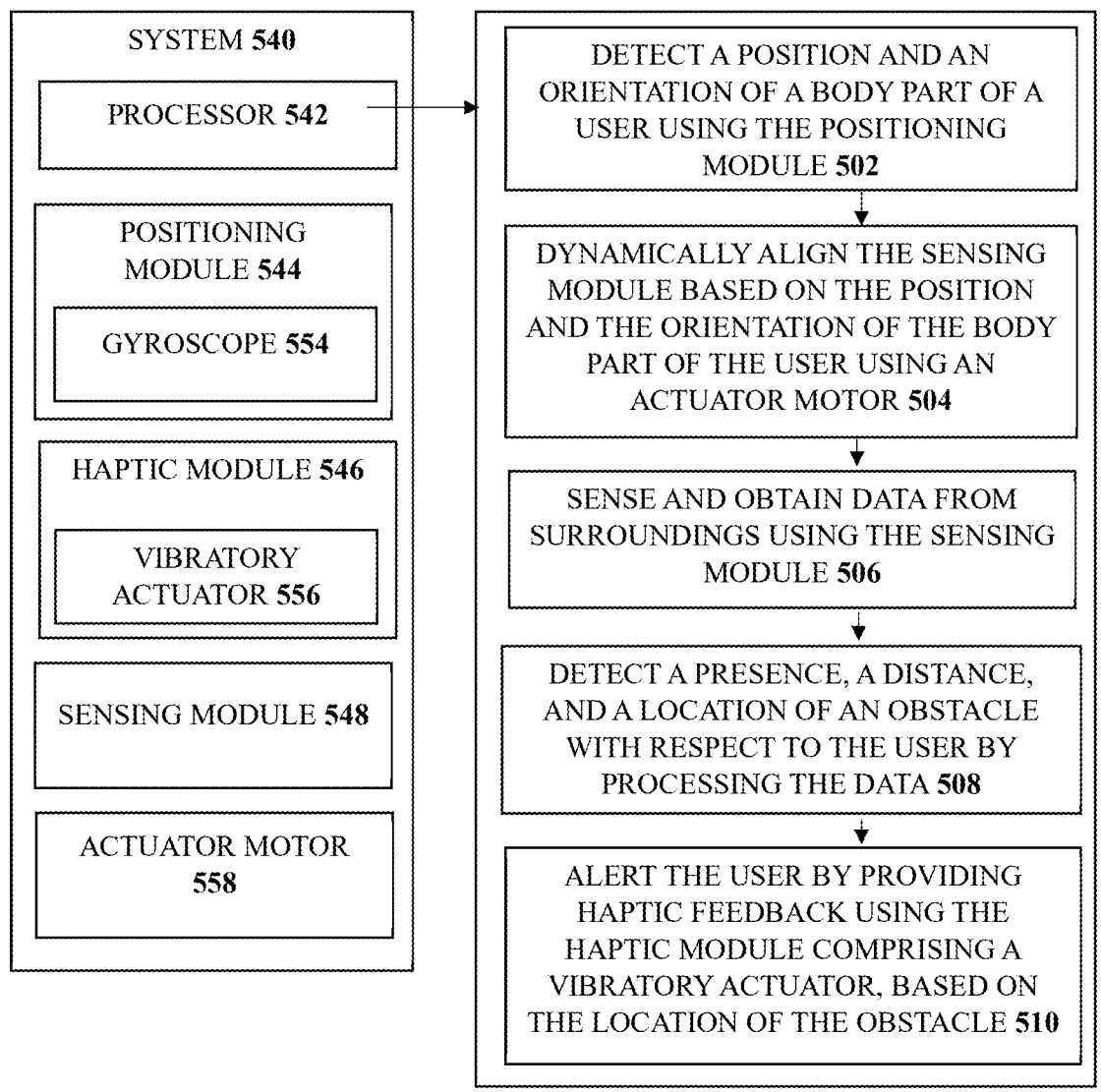
FIG. 5 shows steps executed by a system according to an embodiment of the present disclosure.

FIG. 5 shows steps executed by a system according to an embodiment. According to one or more embodiments the system 540 comprises a sensing module 548; a haptic module 546 comprising vibratory actuator 556; a positioning module 544 comprising a gyroscope 554; an actuator motor 558; and a processor 542. The processor 542 is configured to detect a position and an orientation of a body part of a user using the positioning module in step 502; dynamically align the sensing module based on the position and the orientation of the body part of the user using an actuator motor in step 504; sense and obtain data from surroundings using the ultrasonic sensing module in step 506; detect a presence, a distance and a location of an obstacle with respect to the user by processing the data in step 508; and alert the user by providing haptic feedback using the haptic module comprising the vibratory actuator, based on the location of the obstacle in step 510. In an embodiment the system may be integrated into the smart helmet, wherein the ultrasonic sensing module is dynamically aligned using the positioning module which includes a 3-axis gyroscope in a direction behind the user when the user wears the smart helmet. In another embodiment, the system may be integrated into a wearable object to be worn by the user, wherein the ultrasonic sensing module is dynamically aligned using the positioning module which includes a 3-axis gyroscope in a direction behind the user when the wearable object is worn by the user.

Figure 6:
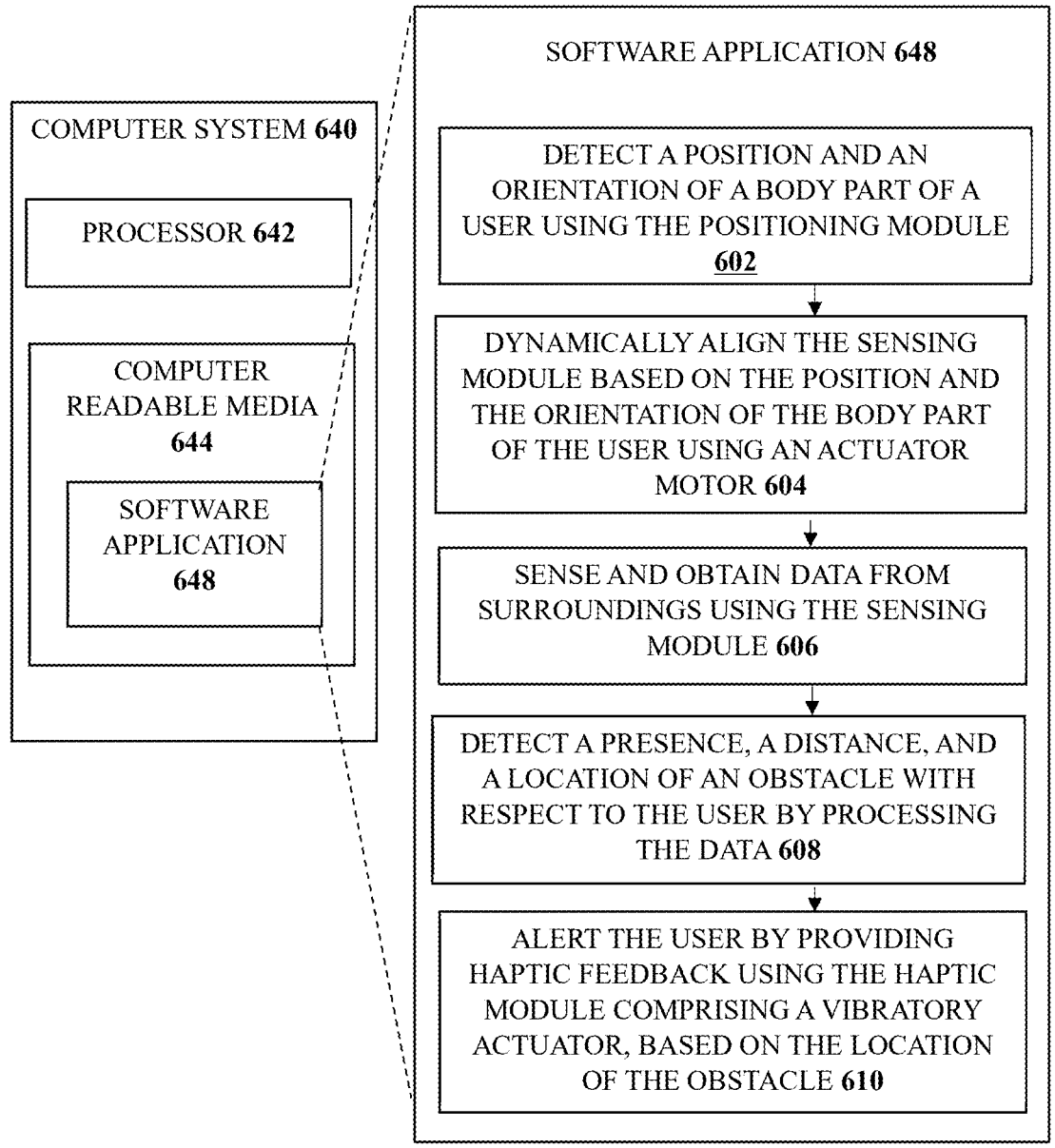
FIG. 6 shows steps executed by a computer-readable media according to an embodiment of the present disclosure.

FIG. 6 shows steps executed by a computer-readable media according to an embodiment. An embodiment relates to a computer-readable media 644 which is a non-transitory computer-readable medium having stored thereon instructions executable by a computer system 640 to perform operations comprising detecting, a position and an orientation of a body part of a user via a positioning module in step 602; aligning dynamically a sensing module based on the position and the orientation of the body part of the user using an actuator motor in step 604; sensing and obtaining data from surroundings via the sensing module in step 606; detecting a presence, a distance and a location of an obstacle with respect to the user by processing the data in step 608; and alerting the user by providing haptic feedback via a haptic module comprising a vibratory actuator, based on the location of the obstacle in step 610. A software application 648 may be stored on the computer-readable media 644 and executed with the processor 642 of the computer system 640.

In an embodiment, the medium and the computer system may be integrated into the smart helmet. In another embodiment, the medium and the computer system may be integrated into a wearable object to be worn by the user.

Figure 7A:
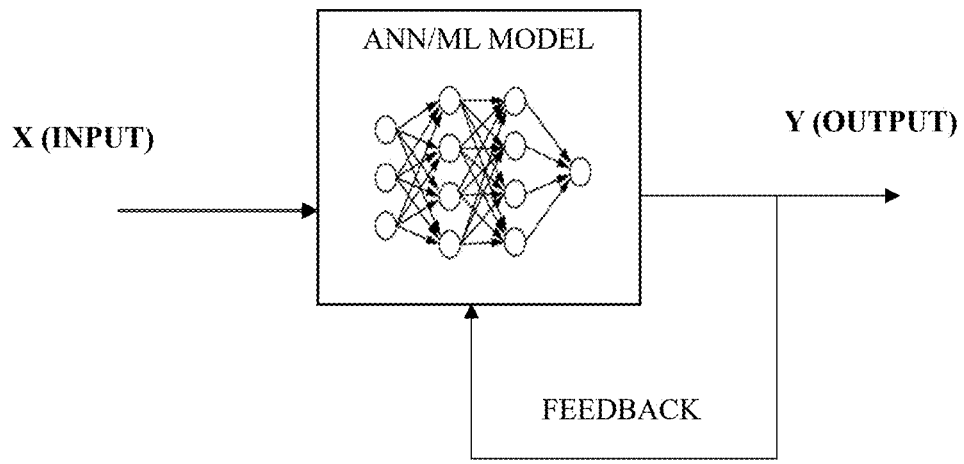
FIG. 7A shows a structure of the neural network/machine learning model with a feedback loop.

FIG. 7A shows a structure of the neural network/machine learning model with a feedback loop. Artificial neural networks (ANNs) model comprises an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed to the next layer of the network. A machine learning model or an ANN model may be trained on a set of data to take a request in the form of input data, make a prediction on that input data, and then provide a response. The model may learn from the data. Learning can be supervised learning and/or unsupervised learning and may be based on different scenarios and with different datasets. Supervised learning comprises logic using at least one of a decision tree, logistic regression, and support vector machines. Unsupervised learning comprises logic using at least one of a k-means clustering, a hierarchical clustering, a hidden Markov model, and an apriori algorithm. The output layer may predict or detect an object and an obstacle from the surroundings and determine and distinguish the obstacle from the object based on the input data. The machine learning model may be incorporated into the smart helmet, and it can be trained to provide different haptic feedback for a different type of obstacle.

Machine learning models can enhance obstacle detection using ultrasonic sensors by learning patterns in sensor data to classify objects, estimate distances, and predict collision risks. The process begins with collecting a diverse dataset from sensors, such as ultrasonic sensors, under varying conditions, such as different obstacle types, sizes, and environmental factors. The raw sensor data, often in the form of time-of-flight signals, is preprocessed to remove noise and normalized for consistency. Key features are then extracted, such as distance values, signal intensity, or rate of change in detected distances, to provide meaningful inputs to the model. Classification models like decision trees or neural networks can identify obstacle types, while regression models predict precise distances. Reinforcement learning can further improve obstacle detection by enabling systems to learn optimal behaviors in dynamic environments through trial and error. By combining ultrasonic sensor data with machine learning, systems can achieve higher accuracy and adaptability in real world obstacle detection and navigation scenarios. In addition to ultrasonic sensors, various other technologies can be used to train the machine learning model to sense obstacles and alert hearing-impaired users through vibration-based feedback systems. These include infrared sensors, LiDAR, radar sensors, stereo vision systems, and even wearable cameras integrated with computer vision models. Infrared sensors can detect nearby obstacles by measuring reflected IR light, making them suitable for short-range applications in controlled lighting conditions. LiDAR provides precise 3D mapping of surroundings by measuring the time-of-flight of laser pulses, enabling obstacle detection in complex environments. Radar sensors, using radio waves, can detect objects in low visibility conditions like rain or fog, offering robust performance for outdoor navigation. Stereo vision systems utilize dual cameras to estimate depth by comparing images, making them effective for identifying obstacles and their spatial layout. Wearable devices with computer vision models can be trained to recognize common obstacles such as trees, rocks, and/or moving objects, using algorithms that process video streams in real time. The data from these sensors can be integrated with vibration actuators to provide spatial and directional feedback. Spatial and directional feedback can be provided through various methods that allow users to perceive the position and proximity of obstacles without relying on auditory cues. One common approach is using vibration feedback arrays in wearable devices, such as helmets, vests, and/or gloves equipped with multiple vibration motors placed around the body. The specific motor that activates corresponds to the direction of the obstacle, while the intensity or frequency of the vibration indicates how close the obstacle is. Another method involves tactile feedback grids integrated into devices like vests, helmets, where a series of actuators or piezoelectric elements can create distinct patterns on the skin, allowing users to feel a designated shape or movement of an obstacle. The spatial arrangement of activated actuators provides clear directional cues. Additionally, auditory feedback with spatial encoding can be used for users with partial hearing, where audio cues are spatially positioned, such as panning sound left or right. The volume or pitch of the sound can also change to reflect the proximity of an obstacle. These systems translate sensory data into tactile or spatial cues, providing hearing-impaired users cues for effective navigation in real time environments. For instance, the intensity or frequency of vibrations can vary depending on the distance or direction of the obstacle. Combining multiple sensing technologies and machine learning further enhances reliability and accuracy for dynamic environments.

In an embodiment, ANNs may be a Deep-Neural Network (DNN), which is a multilayer tandem neural network comprising Artificial Neural Networks (ANN), Convolution Neural Networks (CNN) and Recurrent Neural Networks (RNN) that can recognize features from inputs, do an expert review, and perform actions that require predictions, creative thinking, and analytics. In an embodiment, ANNs may be Recurrent Neural Network (RNN), which is a type of Artificial Neural Networks (ANN), which uses sequential data or time series data. Deep learning algorithms are commonly used for ordinal or temporal problems, such as language translation, Natural Language Processing (NLP), speech recognition, and image recognition, etc. Like feedforward and convolutional neural networks (CNNs), recurrent neural networks utilize training data to learn. They are distinguished by their "memory" as they take information from prior input via a feedback loop to influence the current input and output. An output from the output layer in a neural network model is fed back to the model through the feedback. The variations of weights in the hidden layer(s) will be adjusted to fit the expected outputs better while training the model. This will allow the model to provide results with far fewer mistakes.

The neural network is featured with the feedback loop to adjust the system output dynamically as it learns from the new data. In machine learning, backpropagation and feedback loops are used to train an AI model and continuously improve it upon usage. As the incoming data that the model receives increases, there are more opportunities for the model to learn from the data. The feedback loops, or backpropagation algorithms, identify inconsistencies and feed the corrected information back into the model as an input.

Even though the AI/ML model is trained well, with large sets of labelled data and concepts, after a while, the models' performance may decline while adding new, unlabelled input due to many reasons which include, but not limited to, concept drift, recall precision degradation due to drifting away from true positives, and data drift over time. A feedback loop to the model keeps the AI results accurate and ensures that the model maintains its performance and improvement, even when new unlabelled data is assimilated. A feedback loop refers to the process by which an AI model's predicted output is reused to train new versions of the model.

Initially, when the AI/ML model is trained, a few labelled samples comprising both positive and negative examples of the concepts (e.g., obstacle detection) are used that are meant for the model to learn. Afterward, the model is tested using unlabelled data. By using, for example, deep learning and neural networks, the model can then make predictions on whether the desired concept/s (for e.g., obstacle detection) are in unlabelled images. Each image is given a probability score where higher scores represent a higher level of confidence in the models' predictions. Where a model gives an image a high probability score, it is auto-labelled with the predicted concept. However, in the cases where the model returns a low probability score, this input may be sent to a controller (may be a human moderator) which verifies and, as necessary, corrects the result. The human moderator may be used only in exception cases. The feedback loop feeds labelled data, auto-labelled or controller-verified, back to the model dynamically and is used as training data so that the system can improve its predictions in real time and dynamically.

Figure 7B:
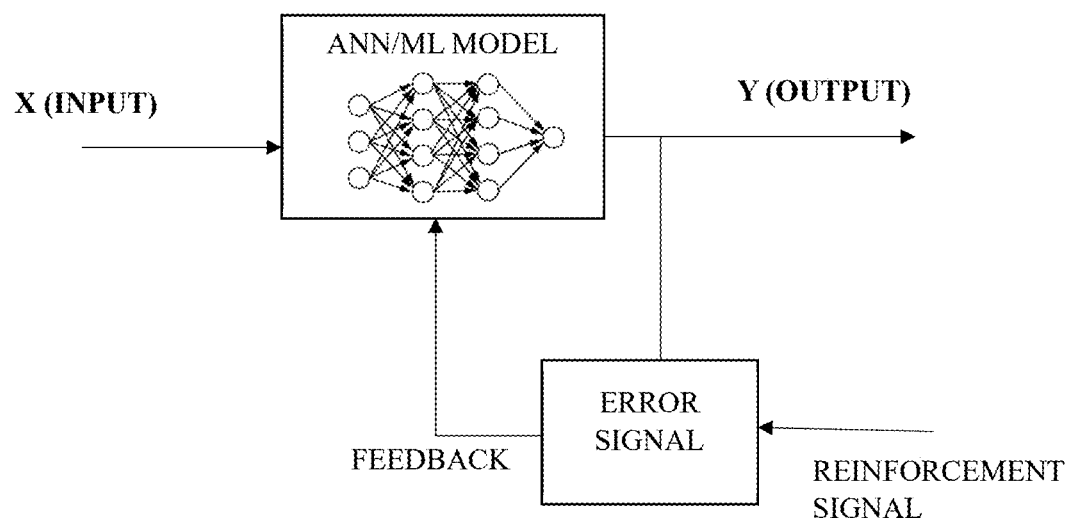
FIG. 7B shows a structure of the neural network/machine learning model with reinforcement learning.

FIG. 7B shows a structure of the neural network/machine learning model with reinforcement learning. The network receives feedback from authorized networked environments. Though the system is similar to supervised learning, the feedback obtained in this case is evaluative not instructive, which means there is no teacher as in supervised learning. After receiving the feedback, the network performs adjustments of the weights to get better predictions in the future. Machine learning techniques, like deep learning, allow models to take labelled training data and learn to recognize those concepts in subsequent data and images. The model may be fed with new data for testing, hence by feeding the model with data it has already predicted over, the training gets reinforced. If the machine learning model has a feedback loop, the learning is further reinforced with a reward for each true positive of the output of the system. Feedback loops ensure that AI results do not stagnate. By incorporating a feedback loop, the model output keeps improving dynamically and over usage/time.

In an embodiment, the system may comprise a cyber security module.

In one aspect, a secure communication management (SCM) computer device for providing secure data connections is provided. The SCM computer device includes a processor in communication with memory. The processor is programmed to receive, from a first device, a first data message. The first data message is in a standardized data format. The processor is also programmed to analyze the first data message for potential cyber security threats. If the determination is that the first data message does not contain a cyber security threat, the processor is further programmed to convert the first data message into a first data format associated with the vehicle environment and transmit the converted first data message to the vehicle system using a first communication protocol associated with the vehicle system.

According to an embodiment, secure authentication for data transmissions comprises, provisioning a hardware-based security engine (HSE) located in communications system, said HSE having been manufactured in a secure environment and certified in said secure environment as part of an approved network; performing asynchronous authentication, validation and encryption of data using said HSE, storing user permissions data and connection status data in an access control list used to define allowable data communications paths of said approved network, enabling communications of the communications system with other computing system subjects to said access control list, performing asynchronous validation and encryption of data using security engine including identifying a user device (UD) that incorporates credentials embodied in hardware using a hardware-based module provisioned with one or more security aspects for securing the system, wherein security aspects comprising said hardware-based module communicating with a user of said user device and said HSE.

Figure 8A:
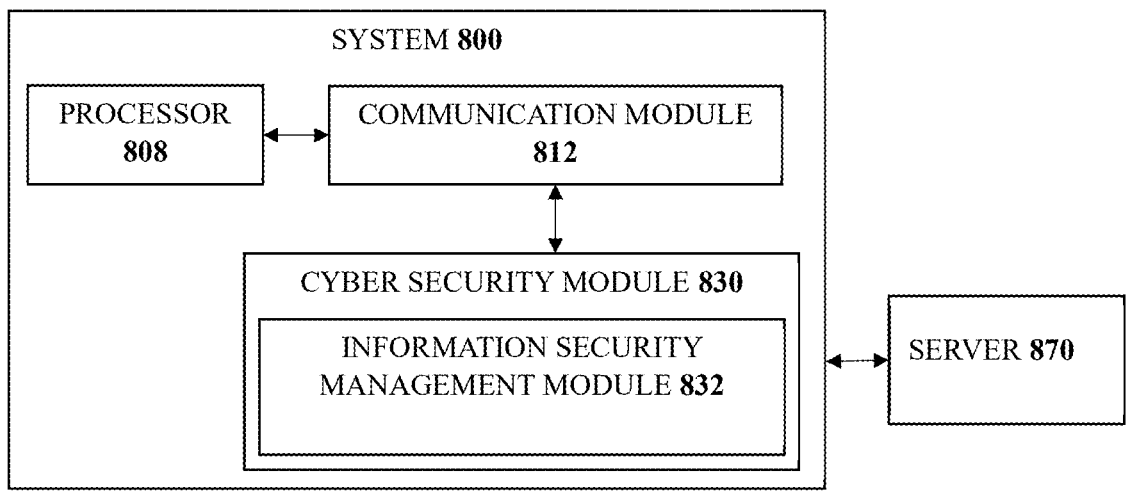
FIG. 8A shows a block diagram of the cyber security module in view of the system and server.

In an embodiment, FIG. 8A shows the block diagram of the cyber security module. The communication of data between the system 800 and the server 870 through the communication module 812, in communication with processor 808, is first verified by the information security management module 832 before being transmitted from the system to the server or from the server to the system. The information security management module is operable to analyze the data for potential cyber security threats, to encrypt the data when no cyber security threat is detected, and to transmit the data encrypted to the system or the server.

Figure 8B:
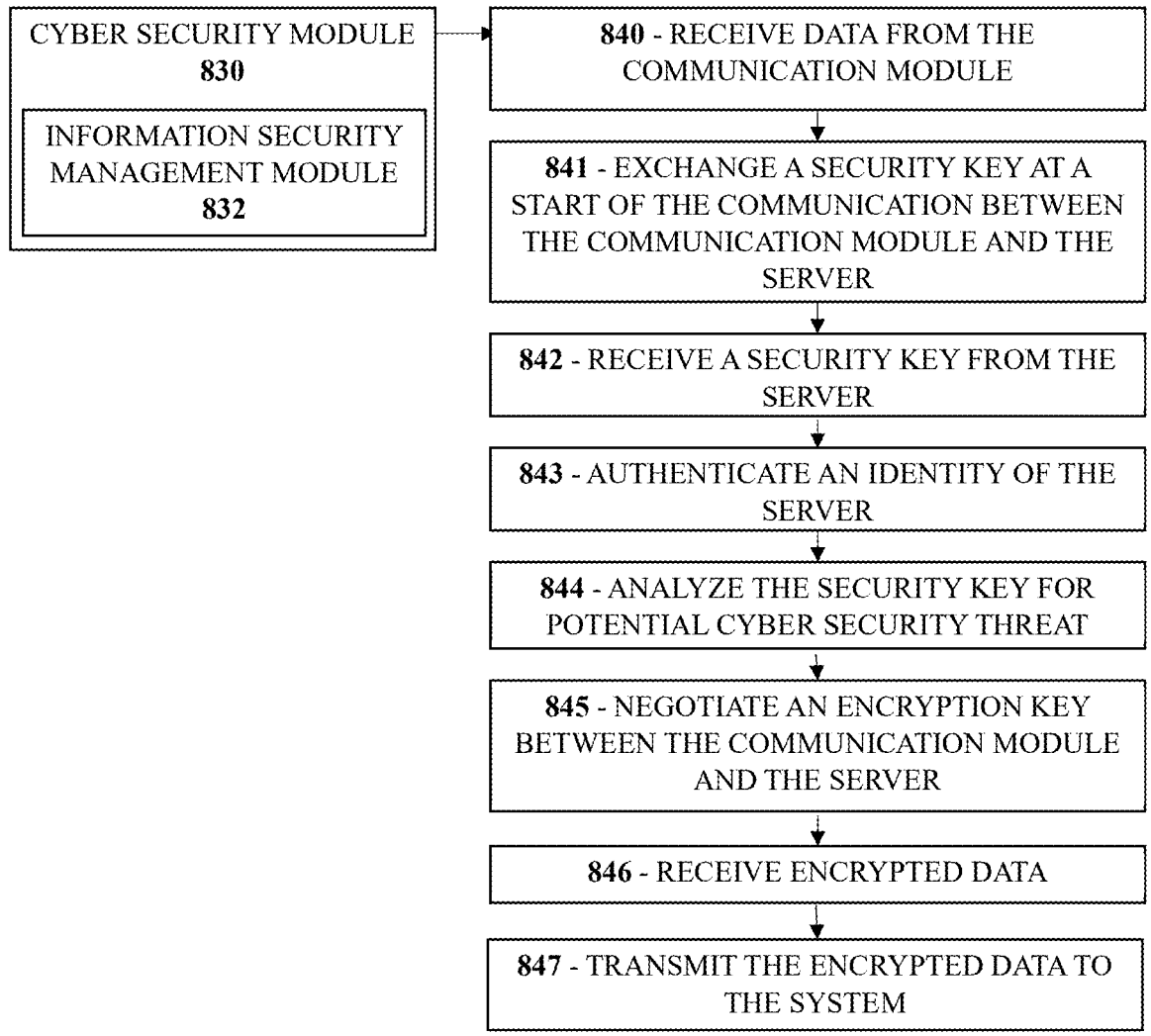
FIG. 8B shows an embodiment of the cyber security module.

In an embodiment, the cyber security module further comprises an information security management module providing isolation between the system and the server. FIG. 8B shows the flowchart of securing the data through the cyber security module 830. At step 840, the information security management module is operable to receive data from the communication module. At step 841, the information security management module exchanges a security key at a start of the communication between the communication module and the server. At step 842, the information security management module receives a security key from the server. At step 843, the information security management module authenticates an identity of the server by verifying the security key. At step 844, the information security management module analyzes the security key for potential cyber security threats. At step 845, the information security management module negotiates an encryption key between the communication module and the server. At step 846, the information security management module receives the encrypted data. At step 847, the information security management module transmits the encrypted data to the server when no cyber security threat is detected.

Figure 8C:
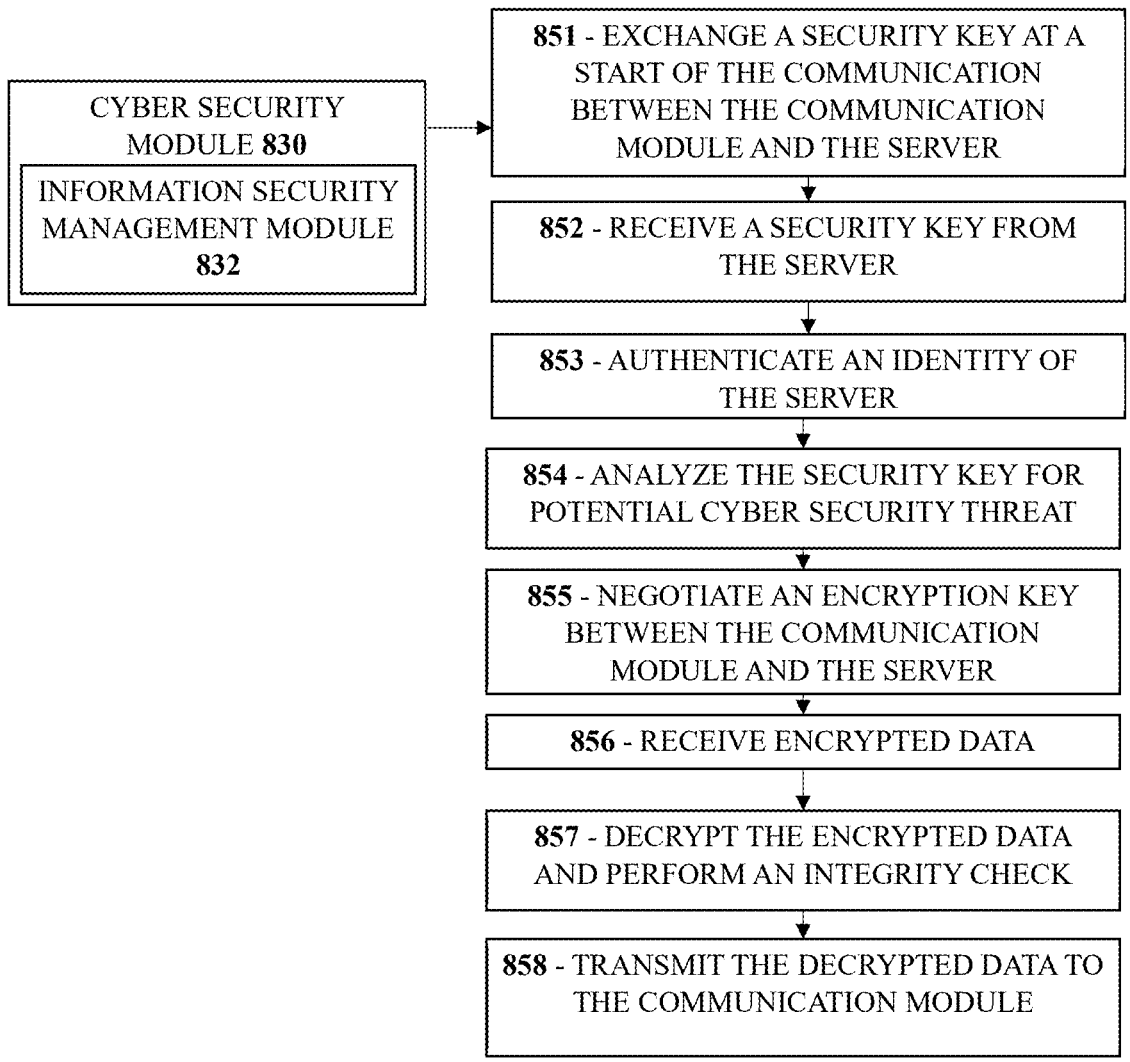
FIG. 8C shows another embodiment of the cyber security module.

In an embodiment, FIG. 8C shows the flowchart of securing the data through the cyber security module 830. At step 851, the information security management module is operable to: exchange a security key at a start of the communication between the communication module and the server. At step 852, the information security management module receives a security key from the server. At step 853, the information security management module authenticates an identity of the server by verifying the security key. At step 854, the information security management module analyzes the security key for potential cyber security threats. At step 855, the information security management module negotiates an encryption key between the communication module and the server. At step 856, the information security management module receives encrypted data. At step 857, the information security management module decrypts the encrypted data, and performs an integrity check of the decrypted data. At step 858, the information security management module transmits the decrypted data to the communication module when no cyber security threat is detected.

In an embodiment, the integrity check is a hash-signature verification using a Secure Hash Algorithm 256 (SHA256) or a similar method.

In an embodiment, the information security management module is configured to perform asynchronous authentication and validation of the communication between the communication module and the server.

In an embodiment, the information security management module is configured to raise an alarm if a cyber security threat is detected. In an embodiment, the information security management module is configured to discard the encrypted data received if the integrity check of the encrypted data fails.

In an embodiment, the information security management module is configured to check the integrity of the decrypted data by checking accuracy, consistency, and any possible data loss during the communication through the communication module.

In an embodiment, the server is physically isolated from the system through the information security management module. When the system communicates with the server as shown in FIG. 8A, identity authentication is first carried out on the system and the server. The system is responsible for communicating/exchanging a public key of the system and a signature of the public key with the server. The public key of the system and the signature of the public key are sent to the information security management module. The information security management module decrypts the signature and verifies whether the decrypted public key is consistent with the received original public key or not. If the decrypted public key is verified, the identity authentication is passed. Similarly, the system and the server carry out identity authentication on the information security management module. After the identity authentication is passed on to the information security management module, the two communication parties, the system and the server, negotiate an encryption key and an integrity check key for data communication of the two communication parties through the authenticated asymmetric key. A session ID number is transmitted in the identity authentication process, so that the key needs to be bound with the session ID number; when the system sends data to the outside, the information security gateway receives the data through the communication module, performs integrity authentication on the data, then encrypts the data through a negotiated secret key, and finally transmits the data to the server through the communication module. When the information security management module receives data through the communication module, the data is decrypted first, integrity verification is carried out on the data after decryption, and if verification is passed, the data is sent out through the communication module; otherwise, the data is discarded.

In an embodiment, the identity authentication is realized by adopting an asymmetric key with a signature.

In an embodiment, the signature is realized by a pair of asymmetric keys which are trusted by the information security management module and the system, wherein the private key is used for signing the identities of the two communication parties, and the public key is used for verifying that the identities of the two communication parties are signed. Signing identity comprises a public and a private key pair. In other words, signing identity is referred to as the common name of the certificates which are installed in the user's machine.

In an embodiment, both communication parties need to authenticate their own identities through a pair of asymmetric keys, and a task in charge of communication with the information security management module of the system is identified by a unique pair of asymmetric keys.

In an embodiment, the dynamic negotiation key is encrypted by adopting a Rivest-Shamir-Adleman (RSA) encryption algorithm. RSA is a public key cryptosystem that is widely used for secure data transmission. The negotiated keys include a data encryption key and a data integrity check key.

In an embodiment, the data encryption method is a Triple Data Encryption Algorithm (3DES) encryption algorithm. The integrity check algorithm is a Hash-based Message Authentication Code (HMAC-MD5-128) algorithm. When data is output, the integrity check calculation is carried out on the data, the calculated Message Authentication Code (MAC) value is added with the header of the value data message, then the data (including the MAC of the header) is encrypted by using a 3DES algorithm, the header information of a security layer is added after the data is encrypted, and then the data is sent to the next layer for processing. In an embodiment the next layer refers to a transport layer in the Transmission Control Protocol/Internet Protocol (TCP/IP) model.

The information security management module ensures the safety, reliability, and confidentiality of the communication between the system and the server through the identity authentication when the communication between the two communication parties starts the data encryption and the data integrity authentication. The method is particularly suitable for an embedded platform which has less resources and is not connected with a Public Key Infrastructure (PKI) system and can ensure that the safety of the data on the server cannot be compromised by a hacker attack under the condition of the Internet by ensuring the safety and reliability of the communication between the system and the server.

The descriptions of the one or more embodiments are for purposes of illustration but are not exhaustive or limiting to the embodiments described herein. Many modifications and variations will be apparent to those of ordinary skill in the art without departing from the scope and spirit of the described embodiments. The terminology used herein best explains the principles of the embodiments, the practical application and/or technical improvement over technologies found in the marketplace, and/or to enable others of ordinary skill in the art to understand the embodiments described herein.

INCORPORATION BY REFERENCE

All references, including granted patents and patent application publications, referred herein are incorporated herein by reference in their entirety.

U.S. Pat. No. 10,210,723B2 titled "Wearable ultrasonic sensors with haptic signaling for blindside risk detection and notification";
U.S. Pat. No. 9,389,677B2 titled "Smart helmet";
U.S. Pat. No. 9,445,639B1 titled "Embedding intelligent electronics within a motorcycle helmet";
US20190357618A1 titled "Smart helmet fall detection method and smart helmet";
US20190261724A1 titled "Helmet system and protective wearable system";
US20140173812A1 titled "Impact reduction system"

What is claimed is:

1. A system comprising:
a sensing module comprising an ultrasonic sensor; a haptic module comprising a vibratory actuator; a positioning module comprising a gyroscope; an actuator motor; and
a processor;
wherein the processor storing instructions in a non-transitory memory that, when executed, cause the processor to:
detect a position and an orientation of a body part of a user using the positioning module;
dynamically align the sensing module based on the position and the orientation of the body part of the user using the actuator motor;
sense and obtain data from surroundings using the sensing module;
detect a presence, a distance, and a location of an obstacle with respect to the user by processing the data; and
alert the user by providing haptic feedback using the haptic module comprising the vibratory actuator, based on the location of the obstacle.

2. The system of claim 1, wherein the system is operable to be integrated into a helmet.

3. The system of claim 2, wherein the sensing module and the positioning module are in a direction behind the user when the helmet is worn by the user.

4. The system of claim 1, wherein the system is operable to be integrated into a wearable object to be worn by the user.

5. The system of claim 1, wherein the gyroscope is a 3-axis gyroscope.

6. The system of claim 1, wherein the sensing module comprises an ultrasonic emitter and an ultrasonic detector, and wherein the ultrasonic emitter is operable to emit an ultrasonic signal, and the ultrasonic detector is operable to receive a signal reflected from the obstacle.

7. The system of claim 6, wherein the haptic feedback is provided to the user when strength of the signal is above a set threshold limit.

8. The system of claim 1, wherein the haptic feedback is selectively provided on a right side of the system when the location of the obstacle is determined to be on a right side of the user, and on a left side of the system when the location of the obstacle is determined to be on a left side of the user.

9. The system of claim 1, wherein the system further comprises a communication module operable to establish a connection with a mobile device and automatically transmit the data in real time.

10. The system of claim 9, wherein the system further comprises a global position satellite (GPS) system operable to determine a current location of the user.

11. The system of claim 9, wherein the communication module is further operable to provide a graphical representation of the data by mapping the presence, the distance and the location of the obstacle, and a current location of the user.

12. The system of claim 1, wherein the system further comprises one or more cameras, wherein the cameras are operable to scan and record a first data from the surroundings.

13. The system of claim 1, wherein the system further comprises one or more of an accelerometer, a magnetometer, and a temperature sensor operable to further aid in detecting a change in the position and the orientation of the user.

14. The system of claim 11, wherein the system further comprises impact sensors operable to detect an impact, wherein the impact is caused by one or more of a collision of the obstacle with a vehicle the user is riding, a collision of the vehicle with the obstacle, and a fall of the user.

15. The system of claim 14, wherein upon detecting the impact, the communication module is operable to transmit a communication comprising the current location of the user to an emergency service.

16. The system of claim 1, wherein the system further comprises a trigger safety mechanism operable to detect a potential collision between the obstacle and a vehicle the user is riding.

17. The system of claim 16, wherein the trigger safety mechanism upon detecting the potential collision, is operable to provide a first haptic feedback via the haptic module comprising the vibratory actuator.

18. A method comprising:
detecting a position and an orientation of a body part of a user using a positioning module;
aligning dynamically a sensing module based on the position and the orientation of the body part of the user using an actuator motor;
sensing and obtaining data from surroundings using the sensing module;
detecting a presence, a distance, and a location of an obstacle with respect to the user by processing the data; and
alerting the user by providing haptic feedback using a haptic module comprising a vibratory actuator, based on the location of the obstacle.

19. The method of claim 18, further comprising:
transmitting automatically, via a communication module, in real time the data to a mobile device; and
determining, via a global position satellite (GPS) system, a current location of the user.

20. A non-transitory computer-readable medium having stored thereon instructions executable by a computer system to perform operations comprising:
detecting, a position and an orientation of a body part of a user via a positioning module;
aligning dynamically a sensing module based on the position and the orientation of the body part of the user using an actuator motor;
sensing and obtaining data from surroundings via the sensing module;
detecting a presence, a distance, and a location of an obstacle with respect to the user by processing the data; and
alerting the user by providing haptic feedback via a haptic module comprising a vibratory actuator, based on the location of the obstacle.

* * * * *